US010301135B2

(12) United States Patent
Sakamoto

(10) Patent No.: US 10,301,135 B2
(45) Date of Patent: May 28, 2019

(54) FILM WINDING DEVICE CONTROL METHOD, FILM ROLL, FILM WINDING DEVICE, AND FILM ROLL PRODUCTION METHOD

(71) Applicant: Sumitomo Chemical Company, Limited, Chuo-ku, Tokyo (JP)

(72) Inventor: Akinobu Sakamoto, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 61 days.

(21) Appl. No.: 15/457,195

(22) Filed: Mar. 13, 2017

(65) Prior Publication Data

US 2017/0267480 A1 Sep. 21, 2017

(30) Foreign Application Priority Data

Mar. 16, 2016 (JP) .................................. 2016-052996

(51) Int. Cl.
*B65H 23/18* (2006.01)
*B65H 18/26* (2006.01)
*B65H 23/198* (2006.01)

(52) U.S. Cl.
CPC ............. *B65H 23/18* (2013.01); *B65H 18/26* (2013.01); *B65H 23/198* (2013.01);
(Continued)

(58) Field of Classification Search
CPC ......... B65H 18/26; B65H 43/00; B65H 23/18
See application file for complete search history.

(56) References Cited

U.S. PATENT DOCUMENTS 3,433,355 A * 3/1969 Smith .................... B65H 75/10
242/160.4
3,977,619 A * 8/1976 Nagata .................. B65H 18/10
242/530.2
(Continued)

FOREIGN PATENT DOCUMENTS

CN 101219743 A 7/2008
CN 101603244 A 12/2009
(Continued)

OTHER PUBLICATIONS

Dehui, W.; Chen, C.; Xiumiao, Y.; Xuesong, L. and Yimin, H., "Optimization of Taper Winding Tension in Roll-to-Roll Web Systems", 2014, Textile Research Journal, vol. 84(20) 2175-2183. (Year: 2014).*

(Continued)

*Primary Examiner* — Mohammad Ali
*Assistant Examiner* — Kelvin Booker
(74) *Attorney, Agent, or Firm* — Panitch Schwarze Belisario & Nadel LLP

(57) ABSTRACT

A method accurately determines internal stress in a film roll and prevents defects in the film roll. A film winding device includes a take-up roller and a winding tension adjustment device. A calculation device uses a winding equation in which a winding tension function is explicitly expressed, the winding tension function expressing a winding tension as a function of a radius of a core. The winding tension adjustment device controls winding tension in accordance with a winding tension distribution function calculated by the calculation device.

8 Claims, 13 Drawing Sheets

(52) U.S. Cl.
CPC ...... *B65H 2513/11* (2013.01); *B65H 2515/31* (2013.01); *B65H 2557/242* (2013.01); *B65H 2701/1752* (2013.01); *B65H 2801/72* (2013.01)

(56) References Cited

U.S. PATENT DOCUMENTS

| | | | |
|---|---|---|---|
| 4,921,183 A | | 5/1990 | Saukkonen et al. |
| 5,505,405 A | * | 4/1996 | Vigneau ............. B65H 19/2269 242/542.1 |
| 7,455,259 B2 | * | 11/2008 | Koutonen ............. B65H 18/20 242/541 |
| 8,152,089 B2 | * | 4/2012 | Shin ................... B65H 23/1955 242/412.2 |
| 9,969,584 B2 | * | 5/2018 | Ostendorf ............. B65H 18/08 |
| 2002/0003004 A1 | * | 1/2002 | Guckert ................. B29C 53/60 138/137 |
| 2008/0164365 A1 | * | 7/2008 | Ueki ...................... A01K 73/06 242/413.5 |
| 2011/0112247 A1 | * | 5/2011 | Tokuchi .................. C08L 33/12 525/57 |
| 2013/0196163 A1 | * | 8/2013 | Swanson ............... B32B 17/061 428/426 |
| 2013/0202904 A1 | * | 8/2013 | Gohr ....................... B32B 27/28 428/515 |
| 2013/0240128 A1 | * | 9/2013 | Mishiro ............. B32B 38/0036 156/185 |
| 2013/0240656 A1 | * | 9/2013 | Merz .................... B32B 17/064 242/410 |
| 2013/0248643 A1 | * | 9/2013 | Newhouse ............. B65H 19/20 242/526 |
| 2014/0220300 A1 | * | 8/2014 | Ullmann ............... B32B 17/066 428/141 |
| 2015/0158690 A1 | * | 6/2015 | Bussmann ......... B65H 23/0251 226/180 |
| 2015/0274483 A1 | * | 10/2015 | Newhouse ............. B65H 19/28 242/613 |
| 2015/0284211 A1 | * | 10/2015 | Hoffmann ............. B65H 18/26 242/534 |
| 2015/0307304 A1 | * | 10/2015 | Hoffmann ............. B65H 26/00 242/533.4 |
| 2016/0207725 A1 | * | 7/2016 | Ostendorf ............. B65H 26/00 |
| 2017/0091674 A1 | * | 3/2017 | Sugimoto ............. G06N 5/045 |
| 2017/0210588 A1 | * | 7/2017 | Sakamoto ............. B65H 75/10 |
| 2017/0267480 A1 | * | 9/2017 | Sakamoto ............. B65H 23/18 |
| 2017/0271640 A1 | * | 9/2017 | Sakamoto ............. H01M 2/145 |
| 2017/0283201 A1 | * | 10/2017 | Kirchhoff ............... B29C 55/06 |

FOREIGN PATENT DOCUMENTS

| | | |
|---|---|---|
| CN | 102674052 A | 9/2012 |
| CN | 102795497 A | 11/2012 |
| JP | 2604001 B2 | 4/1997 |
| JP | 2002362793 A | 12/2002 |
| JP | 2010150041 A | 7/2010 |
| JP | 2012-017159 A | 1/2012 |
| JP | 2012046261 A | 3/2012 |
| JP | 2012188221 A | 10/2012 |
| JP | 2012240814 A | 12/2012 |
| JP | 2013-064650 A | 4/2013 |
| JP | 5606219 B2 | 10/2014 |
| JP | 5719689 B2 | 5/2015 |
| JP | 2015113209 A | 6/2015 |
| JP | 5748514 B2 | 7/2015 |
| JP | 5776077 B2 | 9/2015 |
| JP | 5807876 B2 | 11/2015 |

OTHER PUBLICATIONS

Hashimoto, H., "Intelligent Winding Machine of Plastic Films for Preventing Both Wrinkles and Slippages", Jul. 2015, Modern Mechanical Engineering, vol. 6, 20-31. (Year: 2015).*

Hashimoto, H. and Sunami, Y., "Optimization of Winding Conditions Considering Web Thickness Variation in Width Direction and Experimental Verification", Jun. 26, 2015, Bulletin of the JSME, Mechanical Engineering Journal, vol. 2, No. 6. (Year: 2015).*

Hashimoto, H. and Sunami, Y., "Optimization of Winding Conditions for Preventing Roll Defects Caused by Thermo-Viscoelastic Property and its Experimental Verification", Aug. 25, 2015, Bulletin of the JSME, Mechanical Engineering Journal, vol. 3, No. 1. (Year: 2015).*

Lee, J. and Lee, C., "An Advanced Model for the Numerical Analysis of the Radial Stress in Center-Wound Rolls", Jun. 2, 2015, International Journal of Mechanical Sciences, vol. 105, 360-368. (Year: 2015).*

Office Action dated May 30, 2017 in JP Application No. 2016-052996.

Office Action dated Jan. 22, 2018 in CN Application No. 201710155302.X.

Paanasalo, "Modelling and Control of Printing Paper Surface Winding," Helsinki University of Technology Control Engineering Laboratory Doctoral Dissertation, 174 pages, Jun. 2005 <http://lib.tkk.fi/Diss/2005/isbn9512277506>.

Burns et al., "Strain-Based Formulas for Stresses in Profiled Center-Wound Rolls," TAPPI Journal, vol. 82, No. 7, pp. 159-167 (1999).

"Research on the Development of Winding Devices High-Performance Plastic Film," (Partial Translation), Tokai University Graduate School, doctoral dissertation, 149 pages, (2013).

Kanda et al, "A Winding Model for Unsteady Thermal Stress within Wound Roll Considering Entrained Air Effect on Heat Conduction" (Partial Translation), Transactions of the Japan Society of Mechanical Engineers (Part C), vol. 77, No. 780, pp. 3161-3174 (2011).

Hashimoto et al, "Optimum Winding Tension and Nip-Load into Wound Webs for Protecting Wrinkles and Slippage," (Partial Translation), Transactions of the Japan Society of Mechanical Engineers (Part C), vol. 77, No. 774, 545-555 (2011).

Hashimoto et al, "Basic Theory and Application of Web Handling" (Partial Translation), Tokai University, Converting Technical Institute, 14 pages (2008).

Office Action dated Apr. 11, 2017 in JP Application No. 2016-052996 (Partial English Translation).

Office Action dated May 23, 2018 in CN Application No. 201710155302.X.

* cited by examiner (a) Tension test (b) Stress − strain diagram (c) Young's modulus − stress diagram (a) Compression test (b) Stress − strain diagram (c) Young's modulus − stress diagram

FILM WINDING DEVICE CONTROL METHOD, FILM ROLL, FILM WINDING DEVICE, AND FILM ROLL PRODUCTION METHOD

CROSS-REFERENCE TO RELATED APPLICATION

This Non-provisional application claims priority under 35 U.S.C. § 119 to Japanese Patent Application No. 2016-052996, filed in Japan on Mar. 16, 2016, the entire contents of which are hereby incorporated by reference.

TECHNICAL FIELD

The present invention relates to (a) a method for controlling a film winding device, which device includes at least: a rotation driving device for rotating a core around which a film is wound; and a winding tension adjustment device for adjusting a winding tension with which the film is wound around the core, and (b) the film winding device.

BACKGROUND ART

Films are provided to users in the form of a film roll obtained by winding a film around a cylindrical core. The following defects may occur in a film roll.

(1) Wrinkling: The film wound around the core has waves.

(2) Slippage: The film wound around the core shifts in a width direction of the core.

(3) Creep: In a case where thickness of the film wound around the core varies in a width direction of the film, the film becomes deformed. Once such a film is wound off from the core, it exhibits curving or retains deformation caused by compression and tension.

Note that wrinkling may also be called a "star defect", and slippage may also be called "telescoping".

As an attempt to prevent film roll defects, Patent Literature 2 and Non-Patent Literature 2, in particular, examine determining a winding tension, applied to a film, in accordance with (a) stress acting on film in the film roll (this stress hereinafter referred to as "internal stress") and (b) frictional force between layers of the film.

Non-Patent Literature 5 analyzes internal stress by focusing on strain residing in the film in a film roll (residual strain). Note, however, that the discussions in non-Patent Literature 5 utilize a simplistic assumption with regards to a differential equation for determining stress, and, as a result, internal stress is derived as an analytical solution which is expressed as a mathematical expression merely to the extent allowed by the simplistic assumption. As such, similarly to Patent Literature 2 and Non-Patent Literature 2, Non-Patent Literature 5 fails to achieve a realistic, quantitative examination which takes into account the entrainment and incorporation of air between layers of film.

CITATION LIST

Patent Literature

[Patent Literature 1]
 Japanese Patent Application Publication, Tokukai, No. 2012-017159 (Publication date: Jan. 26, 2012)
[Patent Literature 2]
 Japanese Patent No. 5606219 (Registered on Sep. 5, 2014)
[Patent Literature 3]
 Japanese Patent No. 5748514 (Registered on May 22, 2015)
[Patent Literature 4]
 Japanese Patent No. 5719689 (Registered on Mar. 27, 2015)
[Patent Literature 5]
 Japanese Patent Application Publication, Tokukai, No. 2013-064650 (Publication date: Apr. 11, 2013)
[Patent Literature 6]
 Japanese Patent No. 5807876 (Registered on Sep. 18, 2015)
[Patent Literature 7]
 Japanese Patent No. 5776077 (Registered on Jul. 17, 2015)

Non-Patent Literature

[Non-Patent Literature 1]
 "Uebu Handoringu no Kiso Riron to Ouyou" ("Basic Theory and Application of Web Handling") Hashimoto, Tokai University; Converting Technical Institute, 2008
[Non-Patent Literature 2]
 "Optimum Winding Tension and Nip-Load into Wound Webs for Protecting Wrinkles and Slippage", Transactions of the Japan Society of Mechanical Engineers (in Japanese) (Part C), vol. 77, no. 774, 2011, 545-555
[Non-Patent Literature 3]
 "A Winding Model for Unsteady Thermal Stress within Wound Roll Considering Entrained Air Effect on Heat Conduction", Transactions of the Japan Society of Mechanical Engineers (in Japanese) (Part C), vol. 77, no. 780, 2011, 3161-3174
[Non-Patent Literature 4]
 "Research on the Development of Winding Devices High-Performance Plastic Film", Tokai University Graduate School, doctoral dissertation, academic year of 2013
[Non-Patent Literature 5]
 S. J. Burns, Richard R. Meehan, J. C. Lambropoulos, "Strain-based formulas for stresses in profiled center-wound rolls", TAPPI Journal, Vol. 82, No. 7, p 159-167 (1999)
[Non-Patent Literature 6]
 J. Paanasalo, "Modelling and control of printing paper surface winding", [online], date of search: Jan. 12, 2016, URL: http://lib.tkk.fi/Diss/2005/isbn9512277506

SUMMARY OF INVENTION

Technical Problem

Internal stress in a film roll affects the occurrence of defects in the film roll, and, as such, it is preferable to accurately determine such internal stress. With the conventional techniques disclosed in the above literature, however, it is impossible to adequately reflect the effect, on internal stress, of winding tension used when winding a film around a core. That is, with the conventional techniques, it is difficult to accurately determine internal stress. An object of the present invention is to accurately determine internal stress in a film roll and prevent defects in the film roll.

Solution to Problem

A method in accordance with an aspect of the present invention is a method for controlling a film winding device, the film winding device including at least: a rotation driving device for rotating a core around which a film is wound; and a winding tension adjustment device for adjusting a winding tension with which the film is wound around the core, in which method the winding tension adjustment device is controlled in accordance with an optimized winding tension function, the optimized winding tension function being obtained by use of nonlinear programming which utilizes a winding equation, the winding equation including: a stress function which expresses a radial stress of the film in a film roll, the film roll being constituted by the core and the film wound around the core; and a winding tension function which expresses the winding tension as a function of a coordinate in a radial direction of the core, the winding tension function being explicitly expressed in the winding equation, the optimized winding tension function being the winding tension function as obtained in a case where a design variable no longer changes when the design variable is updated to minimize a value of an expanded objective function, the design variable representing a plurality of values of the winding tension function at a plurality of positions at which a radius of the film roll is divided, the expanded objective function being obtained by adding: (1) an objective function which includes, as parameters, at least (a) a tangential stress in the film roll and (b) a frictional force between layers of the film; and (2) a penalty function in accordance with constraint condition functions which (c) constrain a minimum value of the tangential stress to be a non-negative value and (d) constrain the frictional force to be not less than a critical frictional force at which slippage of the film occurs.

A film roll in accordance with an aspect of the present invention is a film roll including a core and a film wound around the core, in which: the film roll has a radial stress distribution obtained by use of nonlinear programming which utilizes a winding equation, the winding equation including: a stress function which expresses a radial stress of the film in the film roll; and a winding tension function which expresses the winding tension as a function of a coordinate in a radial direction of the core, the winding tension function being explicitly expressed in the winding equation, the radial stress distribution being expressed by the stress function as obtained by solving the winding equation in accordance with an optimized winding tension function, the optimized winding tension function being the winding tension function as obtained in a case where a design variable no longer changes when the design variable is updated to minimize a value of an expanded objective function, the design variable representing a plurality of values of the winding tension function at a plurality of positions at which a radius of the film roll is divided, the expanded objective function being obtained by adding: (1) an objective function which includes, as parameters, at least (a) a tangential stress in the film roll and (b) a frictional force between layers of the film; and (2) a penalty function in accordance with constraint condition functions which (c) constrain a minimum value of the tangential stress to be a non-negative value and (d) constrain the frictional force to be not less than a critical frictional force at which slippage of the film occurs.

A film winding device in accordance with an aspect of the present invention is a film winding device including at least: a rotation driving device for rotating a core around which a film is wound; and a winding tension adjustment device for adjusting a winding tension with which the film is wound around the core, the film winding device controlling the winding tension adjustment device in accordance with an optimized winding tension function, the optimized winding tension function being obtained by use of nonlinear programming which utilizes a winding equation, the winding equation including: a stress function which expresses a radial stress of the film in a film roll, the film roll being constituted by the core and the film wound around the core; and a winding tension function which expresses the winding tension as a function of a coordinate in a radial direction of the core, the winding tension function being explicitly expressed in the winding equation, the optimized winding tension function being the winding tension function as obtained in a case where a design variable no longer changes when the design variable is updated to minimize a value of an expanded objective function, the design variable representing a plurality of values of the winding tension function at a plurality of positions at which a radius of the film roll is divided, the expanded objective function being obtained by adding: (1) an objective function which includes, as parameters, at least (a) a tangential stress in the film roll and (b) a frictional force between layers of the film; and (2) a penalty function in accordance with constraint condition functions which (c) constrain a minimum value of the tangential stress to be a non-negative value and (d) constrain the frictional force to be not less than a critical frictional force at which slippage of the film occurs.

Advantageous Effects of Invention

An aspect of the present invention brings about the effect of preventing defects in a film roll. This makes it possible to improve the quality of the film roll, including quality which is externally manifested and that which is not. This also prevents deformation of a core of the film roll.

DESCRIPTION OF EMBODIMENTS

[Embodiment 1]
(Configuration of Film Winding Device)

Figure 5:
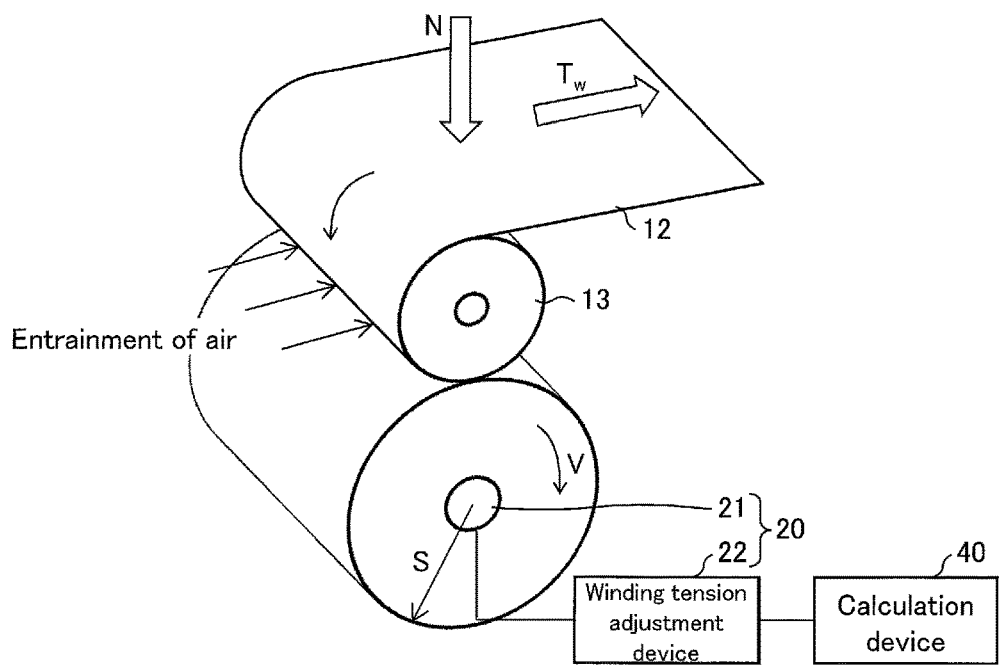
FIG. 5 is a diagram schematically illustrating a configuration of a film winding device in accordance with an embodiment of the present invention.

FIG. 5 is a diagram schematically illustrating a configuration of a film winding device 20 in accordance with Embodiment 1. FIG. 5 illustrates a configuration of the film winding device 20 in its entirety. The film winding device 20 includes a take-up roller 21 and a winding tension adjustment device 22.

The take-up roller 21 has a core fitted thereon and rotates such that a film 12 is wound around the core. A motor is mounted to the take-up roller 21 and causes the take-up roller 21 to rotate. In other words, the take-up roller 21 functions as a rotation driving device that rotates the core. The winding tension adjustment device 22 controls a rotation speed at which the take-up roller 21 rotates.

The core is a cylindrical member which can be fitted to the take-up roller 21. The film 12 being transferred to the film winding device 20 passes between a nip roller 13 and the core, while being pressed by the nip roller 13. The nip roller 30 rotates in keeping with the transference of the film 12.

The film winding device 20 having the above configuration is called a centrally-driven winding system. By using the nip roller 13, the film winding device 20 reduces an amount of air that is entrained and introduced between layers of the film 12 wound around the core.

Figure 14:
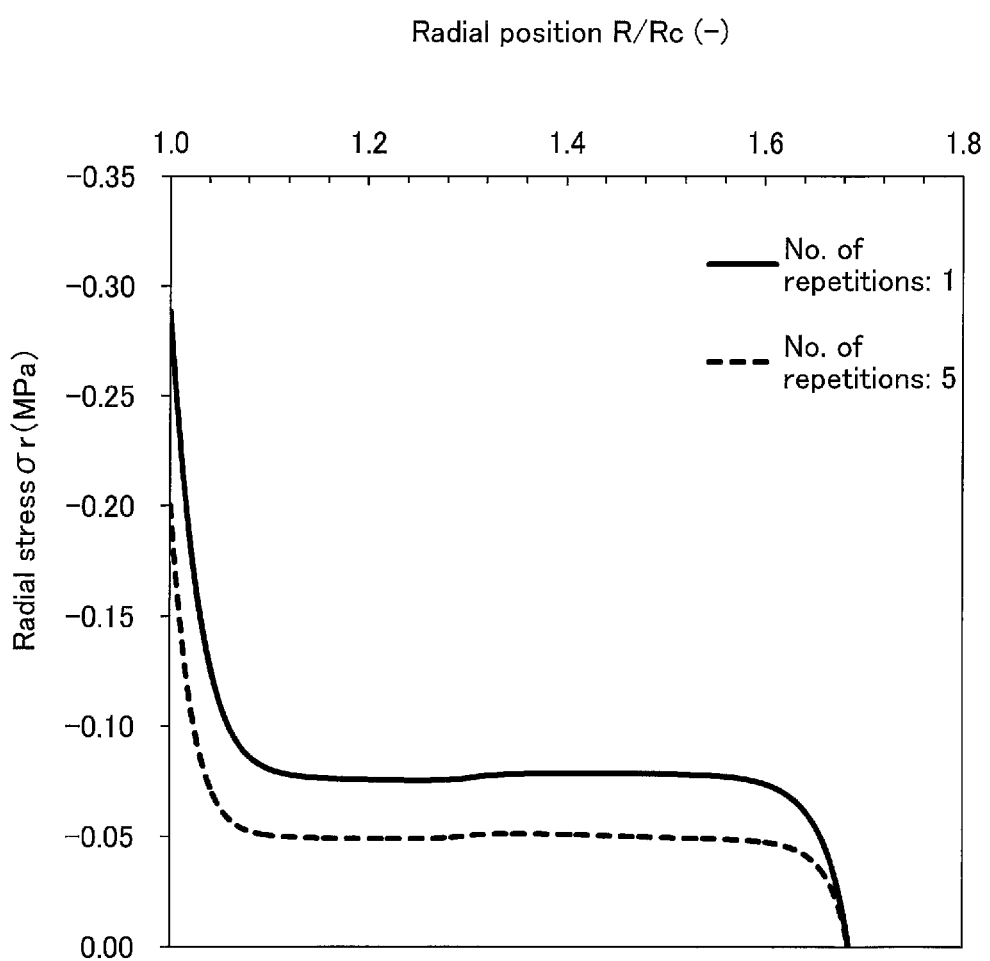
FIG. 14 is a graph showing a relation between the radial position R/Rc and radial stress $\sigma_r$ in optimization of the winding tension distribution function shown in FIG. 11.

A calculation device 40 calculates a winding tension distribution function (winding tension function) as shown in FIG. 14 and provides a result of the calculation to the winding tension adjustment device 22. The winding tension adjustment device 22 controls the rotation speed of the take-up roller 21 in accordance with the winding tension distribution function calculated thusly. In this way, the winding tension T$_w$ of the film 12 is adjusted.

(Operation of Film Winding Device)

In the film roll in accordance with an embodiment of the present invention, a relation between (a) various physical property values of the film, the core and the nip roller, as well as the winding tension used during winding and (b) stress distribution and the like in a roll produced by winding can be analyzed by the method below. Note that the following description assumes the use of a centrally-driven winding system winding machine (as illustrated in FIG. 5) in a winding step.

Figure 1:
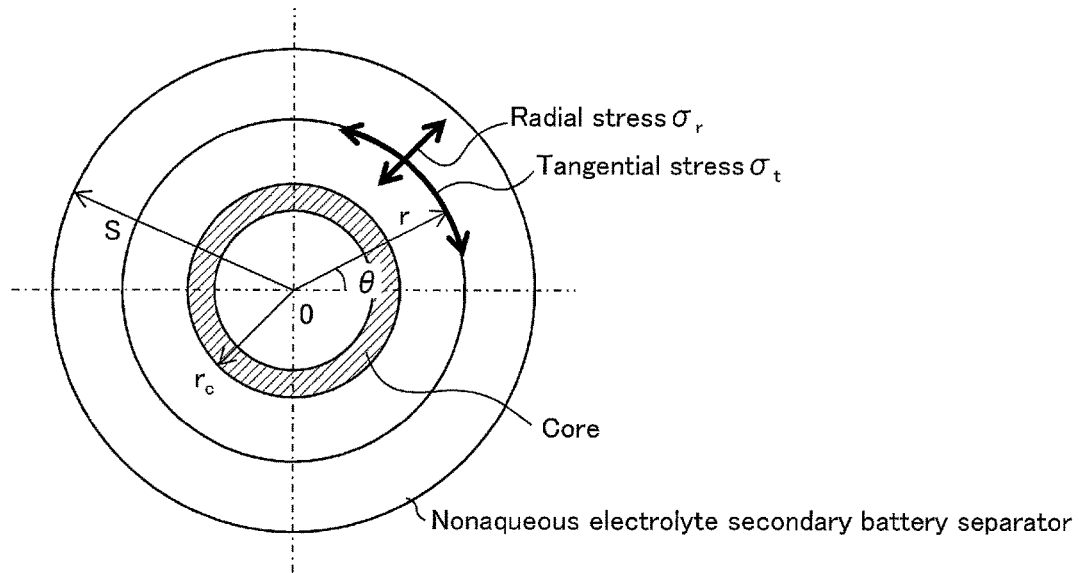
FIG. 1 is a diagram illustrating a configuration of a film roll in accordance with an embodiment of the present invention, as well as tangential stress $\sigma_t$ and radial stress $\sigma_r$ therein.
Figure 2:
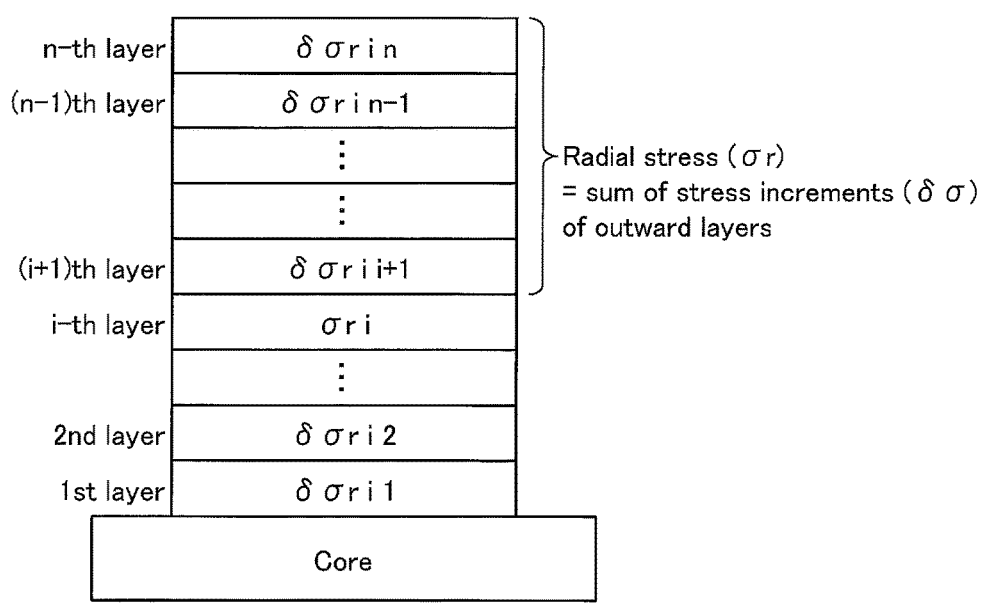
FIG. 2 is a diagram illustrating a laminated structure of the film roll in accordance with an embodiment of the present invention, as well as a relation between (a) the laminated structure and (b) radial stress $\sigma_r$ and a stress increment $\delta\sigma$.

In the film roll in accordance with an aspect of the present invention, radial stress $\sigma_{ri}$ at an i-th layer is obtained by taking the summation of stress increments $\delta\sigma_{rij}$ as observed at each of an (i+1)th layer through an n-th layer (outermost layer). This is expressed by Equation 1 below (see FIG. 2).

[Math. 1]
$$\sigma_{ri} = \sum_{j=i+1}^{n} \delta\sigma_{rij} \qquad (1)$$

Provided that $\delta\sigma_{rij}$ expresses a stress increment at a j-th layer in a case where the film is wound to an i-th layer.

An equation which determines $\delta\sigma_{rij}$ of Equation (1) is generally expressed by Equation (2) (note that the indices "i" and "j" are omitted). Equation (2), which can be used in the field to which the present invention belongs, is called a winding equation.

[Math. 2]
$$r^2 \frac{d^2 \delta\sigma_r}{dr^2} + (3 - v_{rt})r\frac{d\delta\sigma_r}{dr} + \left(1 + v_{rt} - \frac{E_{teq}}{E_{req}}\right)\delta\sigma_r = 0 \qquad (2)$$

(In the above equation, $E_{teq}$ and $E_{req}$ represent property values in the tangential direction and the radial direction, respectively, which property values are obtained when considering the film and an air layer together as a single equivalent layer. $E_{teq}$ and $E_{req}$ are obtained using Equations (18) and (19), respectively. Note also that $v_{rt}$ is the Poisson's ratio of the film.)

Note, however, that with Equation (2), it is impossible to reflect how a winding tension distribution during winding affects internal stress in the film roll. In order to address this issue, an aspect of the present invention utilizes a winding equation represented by Equation (3). Equation (3) is obtained by applying the residual strain model disclosed in Non-Patent Literature 5 to Equation (2). This makes it possible to reflect the effect of winding tension distribution.

[Math. 3]
$$r^2 \frac{d^2 \delta\sigma_r}{dr^2} + (3 - v_{rt})r\frac{d\delta\sigma_r}{dr} + \left(1 + v_{rt} - \frac{E_{teq}}{E_{req}}\right)\delta\sigma_r = \delta\sigma^*(r) \qquad (3)$$

In Equation (3), the left side is identical to that of Equation (2), while $\delta\sigma^*(r)$ on the right side takes into consideration residual strain. Note that, as with Equation (1), $\sigma$ represents stress, while $\delta\sigma$ represents a stress increment. Note also that stress $\sigma^*$ caused by residual strain is expressed by Equation (4), which is also disclosed in Non-Patent Literature 5.

[Math. 4]
$$\sigma^*(r) = \frac{s_{33}\left\{\frac{1}{E_{22}}\frac{d}{dr}[r\sigma_w(r)] + \frac{v}{E_{22}}\sigma_w(r)\right\}}{s_{22}s_{33} - s_{23}^2} \qquad (4)$$

$\sigma_w$ represents force per unit area and is obtained by dividing (a) winding force per unit width, i.e., winding tension (unit: N/m) by (b) thickness. In other words, $\sigma_w$ represents winding stress. Equation (5) is obtained by arranging Equation 4 so as to (a) express Poisson's ratio (v) by using of the notation of the present invention and (b) express winding stress as a stress increment.

[Math. 5]

$$\delta\sigma^*(r) = \frac{s_{33}\left\{\frac{1}{E_{22}}\frac{d}{dr}[r\delta\sigma_w(r)] + \frac{v_{rt}}{E_{22}}\delta\sigma_w(r)\right\}}{s_{22}s_{33} - s_{23}^2} \quad (5)$$

Here, the relational expression of Equation (6) holds true (see Non-Patent Literature 5).

[Math.6]

$$S_{23}=0, S_{22}E_{22}=1 \quad (6)$$

Applying Equation (6) to Equation (5) and subsequently arranging the result thereof provides Equation (7).

[Math. 7]

$$\delta\sigma^*(r) = (1 + v_{rt})\delta\sigma_w(r) + r\frac{d\delta\sigma_w(r)}{dr} \quad (7)$$

Substituting Equation (7) into Equation (3) finally provides Equation (8), which is a winding equation with a residual strain model applied thereto.

[Math. 8]

$$r^2\frac{d^2\delta\sigma_r}{dr^2} + (3 - v_{rt})r\frac{d\delta\sigma_r}{dr} + \left(1 + v_{rt} - \frac{E_{teq}}{E_{req}}\right)\delta\sigma_r = \quad (8)$$

$$(1 + v_{rt})\delta\sigma_w(r) + r\frac{d\delta\sigma_w(r)}{dr}$$

The winding stress $\sigma_w$, the winding stress increment $\delta\sigma_w$, and the winding tension $T_w$ are related as expressed by Equation (9), and $\delta\sigma_w$ can be expressed by use of $T_w$. As such, it is possible to quantitatively express the right side of Winding Equation (8) by use of winding tension distribution function $T_w(r)$.

[Math. 9]

$$\sigma_w(r) = \sigma_w(r + dr) + \delta\sigma_w(r + dr) = \frac{T_w(r) + \mu_{eff0}(r) \times (N/W)}{t_{f0}} \quad (9)$$

Note that the denominator on the right side of Equation (9) is an initial thickness $t_{f0}$ of the film prior to winding, and the numerator is the sum of (a) the winding tension distribution function $T_w(r)$ and (b) an induced component due to a nip load N. Here, W represents the width of the film, and, similarly to the unit of winding tension, the induced component is obtained by multiplying (a) the nip load per unit width (N/W) by (b) an initial effective coefficient of static friction ($\mu_{eff0}$) at a nipped portion. Note that an effective coefficient of static friction is a value at the nipped portion, i.e. at the position of nipping by the nip roller, which value signifies a coefficient of friction between (a) the film in contact with the nip roller and (b) the film therebeneath. Note also that the "initial effective coefficient of static friction" refers to a coefficient of friction, at the position of nipping by the nip roller, between (a) the film in contact with the nip roller and (b) the film therebeneath, when the film is first being wound around the core.

The effective coefficient of static friction ($\mu_{eff0}$) has a value which is dependent on the radial position r and can be obtained by use of Equation (10) below. The effective coefficient of static friction ($\mu_{eff0}$) is classified into three divisions in accordance with the initial value of an air layer thickness ($h_0$). Note that a method for determining the air layer thickness is later discussed. In a case where the air layer thickness is less than a composite root square roughness ($\sigma_{ff}$), the effective coefficient of static friction ($\mu_{eff0}$) becomes the coefficient of static friction ($\mu_{ff}$) between the layers of film in contact with each other. In a case where the thickness of the air layer is greater than three times the composite root square roughness ($\sigma_{ff}$), frictional force is considered not to have an effect, and the effective coefficient of static friction ($\mu_{eff0}$) becomes 0. In an intermediate case where the thickness of the air layer is (a) not less than the composite root square roughness ($\sigma_{ff}$) and (b) not greater than three times the composite root square roughness ($\sigma_{ff}$), the effective coefficient of static friction ($\mu_{eff0}$) is expressed by a linear function relating to the thickness of the air layer.

[Math. 10]

$$\mu_{eff0} = \begin{cases} \mu_{ff} & (h_0 < \sigma_{ff}) \\ \frac{\mu_{ff}}{2}\left(3 - \frac{h_0}{\sigma_{ff}}\right) & (\sigma_{ff} \leq h_0 \leq 3\sigma_{ff}) \\ 0 & (h_0 > 3\sigma_{ff}) \end{cases} \quad (10)$$

The composite root square roughness ($\sigma_{ff}$) is defined in Equation (11). Here, $\sigma_{f1}$ and $\sigma_{f2}$ are the root mean square roughnesses of an outward-facing surface of the film and an inward-facing surface of the film, respectively.

[Math.11]

$$\sigma_{ff} = \sqrt{\sigma_{f1}^2 + \sigma_{f2}^2} \quad (11)$$

The following description discusses a method for obtaining the initial value of the air layer thickness ($h_0$) at the nipped portion. Equation (13) is used to obtain an equivalent radius ($R_{eq}$) from (a) a radius ($R_{nip}$) of the nip roller and (b) an outermost layer position (r=s) of the film roll. Equation (14) is used to obtain an equivalent Young's modulus ($E_{eq}$) from (a) a radial Young's modulus ($E_r$) of the film roll, defined later in Equation (23) and (b) a Young's modulus ($E_{nip}$) of the nip roller. In Equation (14), $v_{nip}$ represents a Poisson's ratio of the nip roller, and "$|_{r=s}$" indicates that the radial Young's modulus ($E_r$) is a value at the outermost layer position (r=s) of the film roll.

By substituting the equivalent radius ($R_{eq}$) and the equivalent Young's modulus ($E_{eq}$) into Equation (12), it becomes possible to obtain the air layer thickness ($h_0$). Note that $\eta_{air}$ represents the viscosity of air, and V represents winding speed.

In Equation (14), since the radial Young's modulus ($E_r$) of the film roll is a value at the outermost layer position (r=s) of the film roll, a loop calculation is necessary. First, an arbitrarily chosen air layer thickness ($h_{01}$) is assumed, and the effective coefficient of static friction ($\mu_{eff0}$) is obtained by use of Equation (10). Next, a boundary condition (15) (described later) can be used to obtain a stress increment ($\delta\sigma_r 51_{r=s}$) at the outermost layer. The air layer thickness ($h_0$) is an air layer formed between (a) the n-th layer, which is the outermost layer, and (b) an (n−1)th layer. Radial stress $\sigma_r$ at the (n−1)th layer acts on this air layer. Note that radial stress $\sigma_r$ at the n-th layer is 0.

Radial stress $\sigma_r$ at the (n−1)th layer is $\delta\sigma_r|_{r=s}$ from Equation (1). By substituting this into Equation (23), it is possible to obtain $E_r|_{r=s}$. By obtaining the equivalent Young's modulus ($E_{eq}$) from Equation (14) and the equivalent radius ($R_{eq}$) from Equation (13), it becomes possible to obtain an air layer thickness ($h_{O2}$) from Equation (12).

If there is a significant difference between (a) the air layer thickness ($h_{O1}$) that has been assumed and (b) the air layer thickness ($h_{O2}$), the former is replaced by the latter in Equation (10), and loop calculations are repeated until a significant difference no longer appears, so as to determine the air layer thickness ($h_O$).

[Math. 12]

$$h_0 = 7.43 R_{eq} \left(\frac{\eta_{air} V}{E_{eq} R_{eq}}\right)^{0.65} \left(\frac{N}{E_{eq} R_{eq}^2}\right)^{-0.23} \quad (12)$$

$$R_{eq} = \frac{1}{\frac{1}{s} + \frac{1}{R_{nip}}} \quad (13)$$

$$E_{eq} = \frac{1}{\frac{1-v_{rt}^2}{E_r|_{r=s}} + \frac{1-v_{nip}^2}{E_{nip}}} \quad (14)$$

Winding Equation (8) is a non-linear second order ordinary differential equation, and two boundary conditions are required, at the outermost layer (r=s) and an innermost layer (r=$r_c$: core radius) of the film roll.

Equation (15) expresses the boundary condition at the outermost layer (r=s), whereas Equation (16) expresses the boundary condition at the innermost layer (r=$r_c$). In Equation (16), $E_c$ represents a radial Young's modulus of the core. These boundary conditions are not particularly limited, but the examples given here are widely used in the literature of the art.

In view of maintaining consistency with results of calculations from the various literatures, in the present invention, Equation (17) is applied in place of Equation (16), with reference to Non-Patent Literature 6. Here, $E_r(i)$ and $\delta\sigma_r(i)$ signify values at an i-th layer.

[Math. 13]

$$\delta\sigma_r|_{r=s} = -\frac{T_w|_{r=s} + \mu_{eff0}(N/W)}{s} \quad (15)$$

$$\left.\frac{d\delta\sigma_r}{dr}\right|_{r=r_c} = \left(\frac{E_{teq}}{E_c} - 1 + v_{rt}\right)\frac{\delta\sigma_r}{r}\bigg|_{r=r_c} \quad (16)$$

$$\frac{\delta\sigma_r|_{r=r_c}}{E_c} r_c + \sum_{i=1}^{n} \frac{\delta\sigma_r(i)}{E_r(i)} t_{f0} = 0 \quad (17)$$

The following description will discuss $E_{req}$ and $E_{teq}$ of Winding Equation (8). A thickness ($t_f$) of the film being compressed by winding can be obtained by use of Equation (21) (described later). An air layer thickness (h) of an air layer being compressed by winding can be obtained by use of Equation (22) (described later). The thickness ($t_f$) of the compressed film and the air layer thickness (h) of the compressed air layer are considered together as a single equivalent layer in (a) Equation (18), which provides the radial Young's modulus ($E_{req}$) of the equivalent layer, and (b) Equation (19), which provides the tangential Young's modulus ($E_{teq}$) of the equivalent layer. Note that $E_{ra}$, provided by Equation (20), represents the radial Young's modulus of the air layer. See Non-Patent Literature 3 with regards to Equations (18) and (19).

[Math. 14]

$$E_{req} = \begin{cases} E_r & (h \leq \sigma_{ff}) \\ \dfrac{t_f + h}{\dfrac{t_f}{E_r} + \dfrac{h}{E_{ra}}} & (h > \sigma_{ff}) \end{cases} \quad (18)$$

$$E_{teq} = \frac{t_f}{t_f + h} E_t \quad (19)$$

$$E_{ra} = \frac{(|\sigma_r| + P_a)^2}{(T_w|_{r=s} + \mu_{eff0}(N/W))/s + P_a} \quad (20)$$

Here, |X| represents the absolute value of X. Radial stress $\sigma_r$ is stress in a direction of compression and is a negative value. As such, the absolute value thereof is used in Equation (20). $P_a$ represents atmospheric pressure.

The thickness $t_f$ of the compressed film and the air layer thickness h of the compressed air layer are provided by Equations (21) and (22), respectively.

[Math. 15]

$$t_f = \left(1 + \frac{\delta\sigma_r}{E_r}\right) t_{f0} \quad (21)$$

$$h = \left(\frac{(T_w|_{r=s} + \mu_{eff0}(N/W))/s + P_a}{|\sigma_r| + P_a}\right) h_0 \quad (22)$$

The radial Young's modulus of the film is obtained using Equation (23) below, where $C_0$ and $C_1$ can be calculated from values actually observed during testing.

[Math.16]

$$E_r = C_0\{1 - \exp(-|\sigma_r|/C_1)\} \quad (23)$$

Winding equation (8) is solved as follows. First, the differential equation is discretized, and a relational expression is derived for three stress increments $\delta\sigma_r(i+1)$, $\delta\sigma_r(i)$, and $\delta\sigma_r(i-1)$. The respective coefficients of each stress increment are represented as Ai, Bi, and Ci, and a constant term quantitatively including the winding tension distribution function $T_w(r)$ is represented as Di, so as to obtain the following:

$$Ai \times \delta\sigma_r(i+1) + Bi \times \delta\sigma_r(i) + Ci \times \delta\sigma_r(i-1) = Di[T_w(r)]$$
$$(i=2\sim n)$$

In a case where i=n, it is possible to obtain $\delta\sigma_r(n+1)$ (where i=n+1 is the outermost layer) by using the boundary condition of Equation (15). As such, the above becomes a relational expression for $\delta\sigma_r(n)$ and $\delta\sigma_r(n-1)$. There are an n number of unknowns, from $\delta\sigma_r(1)$ of the first layer to $\delta\sigma_r(n)$ of the n-th layer. In the above winding equation, there are an (n−1) number of unknowns. As such, another equation is required to solve the above winding equation, but here the boundary condition of Equation (17) is utilized. The stress increment $\delta\sigma_r(i)$ (i=1~n) is obtained by simultaneously solving these n number of equations. Subsequently, with $\delta\sigma_{rij} = \delta\sigma_r(j)$ (j=i+1~n+1), it is possible to obtain the radial stress $\sigma_{ri}$ from Equation (1). Note that "i=A~B" means that i is in a range from A to B, including A and B.

A more specific example is as follows. In a case where, for example, a number of turns is 1,000, n=2 is used initially, and a simultaneous equation with two unknowns is solved to obtain $\delta\sigma_r(1)$ and $\delta\sigma_r(2)$. Next, the number of turns is increased by one so as to be n=3, and a simultaneous equation with three unknowns is solved. In doing so, coefficient B includes ($E_{ted}/E_{req}$), obtained from Equations (18) and (19), and becomes a function of radial stress $\sigma_r$. For this reason, coefficient B is called a non-linear differential equation. For this non-linear differential equation, a method of iterative approximation of solutions is employed, where an approximation of coefficient B is obtained by using the calculation results obtained for n=2. In this manner, each time the number of turns increase, coefficient B is approximated by using the calculation results obtained for the previous number of turns, and a simultaneous equation having a number of unknowns equivalent to the number of turns is solved. Ultimately, the calculations finish upon the solution of a simultaneous equation with 1,000 unknowns.

Note that with regards to a method for solving simultaneous equations, methods such as direct methods and indirect methods are known, but the method to be employed can be chosen in view of precision of calculations and cost of calculations. Used here is Gaussian elimination, which is one type of direct method that has a high cost of calculation but superior precision of calculation.

Finally, the tangential stress $\sigma_t$ can be obtained via Equation (24) below by using the radial stress $\sigma_r$. Discretization is utilized in this case as well.

[Math. 17]

$$\sigma_t = r\frac{d\sigma_r}{dr} + \sigma_r \qquad (24)$$

Analyzing stress in the film roll can thus be described as above. From the results of this analysis, the following items in particular are used in calculations when examining optimization as discussed in the following description:
  distribution of radial stress
  radial stress at a position equivalent to 95% of maximum winding radius (a position equivalent to 95% of a length from the center of the core to the outermost layer of the film roll)
  distribution of tangential stress
  minimum value of tangential stress
[Optimization]

Figure 6:
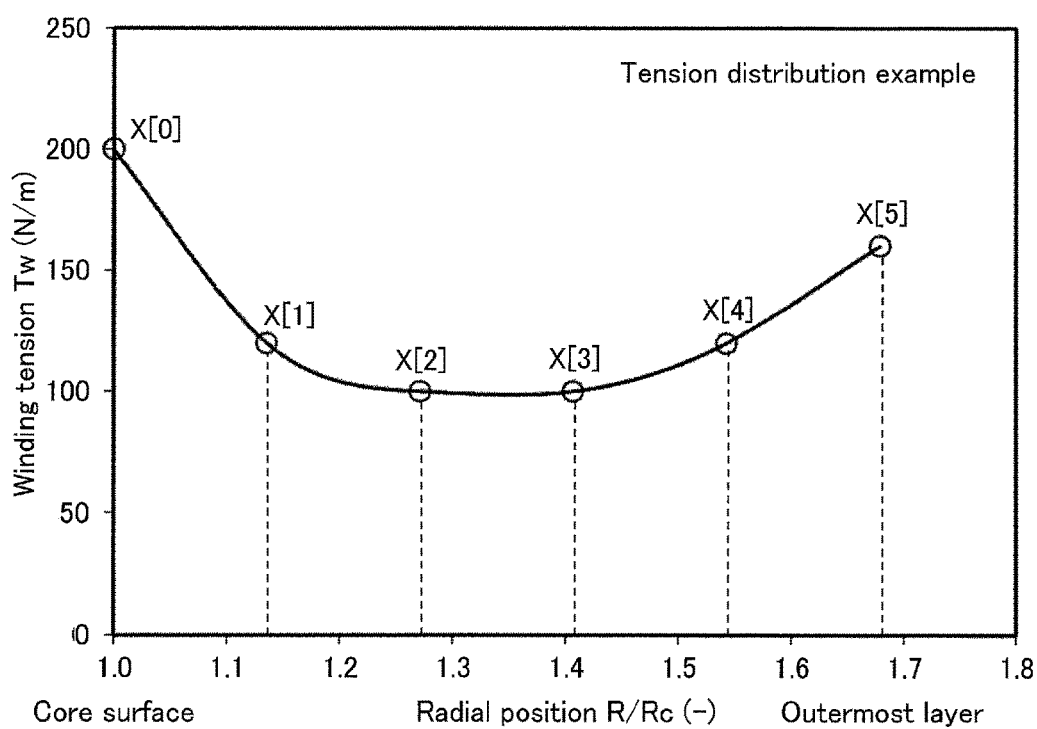
FIG. 6 is a graph showing an example of a winding tension distribution used during winding in production of a film roll.

The following description will discuss, in detail, a method of optimization. Here, the winding tension distribution function is described, with reference to FIG. 6, by using an example involving division into fifths in the radial direction. Note that although the number of divisions is not limited, an increase in the number of divisions causes an increase in calculation variables and thus an increase in the cost of calculations. It is therefore preferable for the number of divisions to be the required minimum. The number of divisions is, generally, in a range from three to ten. Here, the index i is used as a number for a division point, where the core surface is i=0, and the outermost layer is i=5. A radial position r at each division point i is represented by $r_i$, and a winding tension at each division point i is represented by a design variable X[i]. Before optimization is carried out, an initial value of X[i] is set to be a temporary value. For example, a conventional fixed tension distribution or a tapered tension distribution can be used as the initial value.

A cubic spline function shown in Equation (25) below is used as the winding tension distribution function. Note that the index i represents integers from 0 through 4 (4 being obtained by subtracting 1 from the number of divisions, i.e., from 5). $\Delta r$ represents a radial division interval. With regards to factors other than winding tension, such as nip load, for which distribution optimization is to be carried out, a cubic spline function similar to that of Equation (25) can be used. Note, however, that an increase in distribution optimization factors will cause an increase in design variables and cost of calculations. As such, it is preferable to select distribution optimization factors in accordance with, for example, the specifications of the winding device and the method of use thereof. The following description will exemplarily discuss the optimization of winding tension distribution.

[Math. 18]

$$T_w(r) = \left(\frac{M_i}{6\Delta r}\right)(r_{i+1} - r)^3 + \left(\frac{M_{i+1}}{6\Delta r}\right)(r - r_i)^3 + \left(X[i] - \frac{M_i\Delta r^2}{6}\right)\frac{r_{i+1} - r}{\Delta r} + \left(X[i+1] - \frac{M_{i+1}\Delta r^2}{6}\right)\frac{r - r_i}{\Delta r} \qquad (25)$$

Here, because first derivatives at each division point i are continuous, the relation expressed by Equation (26) holds true for a shape parameter $M_i$. Note that the index i takes a value from 0 through 3.

[Math.19]

$$M_i + 4M_{i+1} + M_{i+2} = 6(X[i] - 2X[i+1] + X[i+2])/\Delta r^2 = a_{i+1} \qquad (26)$$

Further, by setting the respective first derivatives at each end as a slope between two points, Equation (27) below holds true.

[Math.20]

$$2M_0 + M_1 = 0 \quad 2M_5 + M_4 = 0 \qquad (27)$$

By using Equations (26) and (27) to solve a simultaneous equation with 6 unknowns with respect to $M_i$, it ultimately becomes possible to obtain $M_i$ by using Equation (28).

[Math.21]

$$M_1 = (194a_1 - 52a_2 + 14a_3 - 4a_4)/627$$

$$M_0 = -M_1/2 \quad M_2 = a_1 - 7M_1/2$$

$$M_3 = a_2 - 4a_1 + 13M_1 \quad M_4 = 2(a_4 - M_3)/7 \quad M_5 = -M_4/2 \qquad (28)$$

The above makes it possible to calculate, from Equation (25), the tension $T_w(r)$ between division points i and i+1, i.e., between radial positions $r_i$ and $r_{i+1}$. By starting with index i at a value of 0 and sequentially increasing the value up to 4, it is possible to calculate the tension distribution from the core surface to the outermost layer.

Optimization of the winding tension distribution function $T_w(r)$ can be replaced by a mathematical problem of finding a design variable X which minimizes an expanded objective function F(X), the expanded objective function F(X) being the sum of (a) an objective function f(X) and (b) a penalty function P(X) (described later). Sequential quadratic programming (nonlinear programming) is a known method for solving this mathematical problem.

expanded objective function F(X)=objective function f(X)+penalty function P(X) (29)

The method disclosed in Non-Patent Literature 4, however, requires significant calculating time when solving for a penalty coefficient to use in the penalty function. Furthermore, Non-Patent Literature 4 discloses a direct search method as a method for obtaining step size, but no details thereof are disclosed, thus rendering the specific calculation method unclear. The following description will provide a specific method which is improved such that calculating time is shortened.

The design variable X is a column vector and is expressed by Equation (30) below. In a case where the winding tension X[0] at the beginning of winding, i.e., at the core surface, is completely unknown, the winding tension X[0] may be included in the design variable. However, since the winding tension X[0] is often determined empirically, such as by winding at a conventional fixed tension or tapered tension distribution, the following example treats the winding tension X[0] as a fixed value excluded from the design variable. This winding tension X[0] is also used for nondimensionalization of the objective function (later described).

[Math. 22]

$$X = \begin{pmatrix} X[1] \\ X[2] \\ X[3] \\ X[4] \\ X[5] \end{pmatrix} \quad (30)$$

The objective function f(X) is defined by Equation (31) below.

[Math. 23]

$$f(x) = \sum_{i=1}^{n-1} \left( \underbrace{\left(\frac{F_i}{F_{cr}} - 1\right)^2}_{\text{Frictional force}} + \underbrace{\left(\frac{\sigma_{t,i}}{\sigma_{t,ref}}\right)^2}_{\text{Tangential stress}} \right) \quad (31)$$

The objective function is obtained as the summation, for a number of divisions n, of (a) frictional force $F_i$ between film layers at each division point i and (b) tangential stress $\sigma_{t,i}$ at each division point i. The frictional force $F_i$ and the tangential stress $\sigma_{t,i}$ are obtained by referencing the results of analysis of internal stress in the film roll as described above. Here, the frictional force $F_i$ can be obtained from Equation (33) below, $F_{cr}$ represents a critical frictional force at which slippage begins, and $\sigma_{t,ref}$ is a reference value of tangential stress. Since $F_i$ and $F_{cr}$ are of the same dimension, and $\sigma_{t,i}$ and $\theta_{t,ref}$ are also of the same dimension, dividing $F_i$ by $F_{cr}$ and $\sigma_{t,i}$ by $\sigma_{t,ref}$ renders the objective function a dimensionless value. Note that the critical frictional force is defined as a value where slippage can occur when the frictional force is less than the critical frictional force.

In the summation, the division point i is in a range from i=1 through n−1. The reason for excluding i=0 is that the tension X[0] at the beginning of winding is set to a fixed value and excluded from the design variable. The reason for excluding the i=n, i.e., the outermost layer, is that frictional force F there will be 0 in all cases.

The reference value $\sigma_{t,ref}$ is defined by Equation (32) below. Specifically, the reference value $\sigma_{t,ref}$ is defined as stress (unit: N/m²=Pa) obtained by dividing (a) tension (unit: N/m) at the beginning of winding, which tension is a fixed value, by (b) an initial film thickness (unit: m).

[Math. 24]

$$\sigma_{t,ref} = X[0]/t_{f0} \quad (32)$$

Frictional force $F_i$ between film layers at each division point i is defined by Equation (33). The product of (a) circumferential length ($2\pi r_i$) and (b) film width (W) is the area (S) on which the frictional force acts. The product of (a) the area (S) and (b) the absolute value ($|\sigma_{r,i}|$) of radial stress applied normally to this area is normal force. Frictional force is defined as the product of (a) the normal force and (b) the coefficient of friction ($\mu_{eff}$).

[Math. 25]

$$F_i = 2\pi r_i \mu_{eff} |\sigma_{r,i}| W \quad (33)$$

The film roll in accordance with an embodiment of the present invention has a coefficient of friction ($\mu_{eff}$) between film layers that is defined by Equation (34). This coefficient of friction ($\mu_{eff}$) is not a function of the initial value of the air layer thickness ($h_0$) at the nipped portion, but rather a function of the air layer thickness (h) of the compressed air layer after winding, as calculated in Equation (22).

[Math. 26]

$$\mu_{eff} = \begin{cases} \mu_{ff} & (h < \sigma_{ff}) \\ \frac{\mu_{ff}}{2}\left(3 - \frac{h}{\sigma_{ff}}\right) & (\sigma_{ff} \leq h \leq 3\sigma_{ff}) \\ 0 & (h > 3\sigma_{ff}) \end{cases} \quad (34)$$

The following description will discuss constraint conditions. Equations (35) and (36) define constraint conditions with regards to the design variable X, the minimum value $\sigma_{t,min}$ of tangential stress, and frictional force F95 between layers of film. Here, m represents the number of constraint condition functions g. Specifically, from Equation (36), m is 12. In a case where one of the constraint condition functions g does not satisfy Equation (35), a penalty (described later) is imposed, and the expanded objective function F increases in value and deteriorates.

[Math. 27]

$$g_i(X) \leq 0 \quad (i = 1 \sim m) \quad (35)$$

$$g_1(X) = \frac{0 - X[1]}{X[0]} \quad g_2(X) = \frac{X[1] - 2X[0]}{X[0]} \quad (36)$$

$$g_3(X) = \frac{0 - X[2]}{X[0]} \quad g_4(X) = \frac{X[2] - 2X[0]}{X[0]}$$

$$g_5(X) = \frac{0 - X[3]}{X[0]} \quad g_6(X) = \frac{X[3] - 2X[0]}{X[0]}$$

$$g_7(X) = \frac{0 - X[4]}{X[0]} \quad g_8(X) = \frac{X[4] - 2X[0]}{X[0]}$$

$$g_9(X) = \frac{0 - X[5]}{X[0]} \quad g_{10}(X) = \frac{X[5] - 2X[0]}{X[0]}$$

$$g_{11}(X) = \frac{-\sigma_{t,min}}{\sigma_{t,ref}} \quad g_{12}(X) = \frac{Fcr - F95}{Fcr}$$

Here, the constraint condition functions are nondimensionalized in the same manner as the objective function. Constraint condition functions $g_1$ through $g_{10}$ are defined from a range of values which the value of the design variable X[i] (i=1~5) can take. The range of values is not particularly limited, and can be determined from the tension range specified for the winding device. Here, the constraint condition functions $g_1$, $g_3$, $g_5$, $g_7$ and $g_9$ are defined by using a minimum value of 0. In a case where the design variable X has become a negative value, the constraint condition functions g become positive. In such a case, since the constraint conditions (35) are not satisfied, the penalty is imposed. The constraint condition functions $g_2$, $g_4$, $g_6$, $g_8$, and $g_{10}$, on the other hand, are defined by using an example where the maximum value is a value that is twice the tension X[0] at the beginning of winding. In a case where the design variable X exceeds 2X[0], the constraint condition functions g become positive. In such a case, since the constraint conditions (35) are not satisfied, the penalty is imposed.

Note that $\sigma_{t,min}$ of constraint condition function $g_{11}$ is a minimum value of tangential stress distribution. In a case where this minimum value has become a negative value, the defect known as wrinkling is likely to occur. In such a case, the constraint condition function $g_{11}$ takes on a positive value, the constraint conditions (35) are not satisfied, and the penalty is imposed.

Furthermore, in a case where the frictional force F95 is less than the critical frictional force $F_{cr}$, the defect known as slippage is likely to occur. In such a case, the constraint condition function $g_{12}$ takes on a positive value, the constraint conditions (35) are not satisfied, and the penalty is imposed.

Discussed next is the penalty function P(X). With regards to a method for imposing a penalty in nonlinear programming, typically known methods include, for example, exterior point methods and interior point methods. Here, an exterior point method is used exemplarily. In an exterior point method, the penalty is imposed in a case where the design variable X does not satisfy the constraint conditions.

Specifically, the penalty function P(X) is defined by Equation (37), and the expression max{0,$g_i$(X)} therein is defined by Equation (38). In other words, max{0,$g_i$(X)} is defined as taking on whichever value is greater, 0 or $g_i$(X). In a case where the constraint conditions are satisfied, 0 is returned, and the penalty function P(X) does not increase. In a case where the constraint conditions are not satisfied, a positive value of g is returned, and the penalty function P(X) increases.

Note that p in Equation (37) is a penalty coefficient and is a positive constant. The penalty coefficient p is preferably increased with each recursion step (k) (described later). In terms of reducing the cost of calculations, it is preferable to use the Sequential Unconstrained Minimization Technique (SUMT), which aims to sequentially arrive at an optimal solution as an expanded objective function F(X) with a small penalty transitions to an expanded objective function with a large penalty. A specific method of increase is provided in Equation (39), where p is multiplied by c with each recursion step. A possible example is p(1)=1000, c=2.

[Math. 28]

$$P(X) = p \times \sum_{i=1}^{i=m} |\max\{0, g_i(X)\}|^2 \quad (37)$$

$$\max\{0, g_i(X)\} = \begin{cases} 0 & (g_i(X) \leq 0) \\ g_i(X) & (g_i(X) > 0) \end{cases} \quad (38)$$

$$p(k+1) = p(k) \times c \quad (39)$$

The objective function f(X) and the penalty function P(X) are described as above, and a summation of these provides the expanded objective function F(X). Optimization of the winding tension distribution function $T_w(r)$ can be replaced by Equation (40), as the mathematical problem to find a design variable X to minimize the expanded objective function F(X) (Find X to minimize . . . subject to . . . ). This mathematical problem is solved by using nonlinear programming described later.

[Math. 29]

Find X to minimize F(X)=f(X)+P(X) subject to $g_i(X)$
$\leq 0$ (i=1~m) (40)

The following description will discuss a flow of calculations in the nonlinear programming. Calculations proceed as in Steps 1 through 8. A description of each step is as follows.

Step 1: Set various parameters such as an initial value of the design variable X(k), an initial value of the penalty coefficient p(k), and physical property values. k: number of recursion steps=1

Step 2: Find a search vector d(k) to minimize the expanded objective function F.

$$d(k) = -B(k)^{-1} \cdot \nabla F(X(k))$$

B: Hessian matrix, $\nabla F$: gradient vector

Step 3: If d(k)=0, it is deemed that convergence has occurred, and the calculations end. Otherwise, proceed to Step 4, and repeat Steps 2 through 8 until d(k)=0.

Step 4: Use the Armijo rule to obtain a step size Step(k).
Step 5: Update the design variable.

$$X(k+1) = X(k) + \text{Step}(k) \times d(k)$$

Step 6: Update the penalty coefficient.

$$p(k+1) = p(k) \times C$$

Step 7: Use a quasi-Newton method, BFGS formula to obtain a Hessian matrix B(k+1).
Step 8: Set k=k+1 and return to Step 2.

<Step 1>
In Step 1, various parameters necessary for solving the winding equation are set. Examples include (a) physical property values of the film, (b) property values of the core and the nip roller, and (c) winding conditions. An initial value of the design variable X(k), an initial value of the penalty coefficient p(k), and the like are set as parameters of nonlinear programming. The number of recursion steps k is set to 1.

<Step 2>
In Step 2, the search vector d(k) which minimizes the expanded objective function F(X) is found. The search vector is defined in Equation (41). The gradient vector VF and the Hessian matrix B are defined in Equations (42) and (43), respectively. Note that $B^{-1}$ is an inverse matrix of B, and $X_1$ through $X_5$ of Equations (42) and (43) represent the design variable X[i] (i=1~5). As can be seen from Equations (42) and (43), because the expanded objective function F is differentiated with respect to the design variable X, it is possible to find which direction of movement of the design variable X will enable minimization of the expanded objective function F.

[Math. 30]

$$d(k) = B^{-1} \cdot \nabla F \quad (41)$$

-continued $$\nabla F(X(k)) = \begin{pmatrix} \partial F/\partial X_1 \\ \partial F/\partial X_2 \\ \partial F/\partial X_3 \\ \partial F/\partial X_4 \\ \partial F/\partial X_5 \end{pmatrix} \quad (42)$$

$$B = \begin{pmatrix} \frac{\partial^2 F}{\partial X_1 \partial X_1} & \frac{\partial^2 F}{\partial X_1 \partial X_2} & \frac{\partial^2 F}{\partial X_1 \partial X_3} & \frac{\partial^2 F}{\partial X_1 \partial X_4} & \frac{\partial^2 F}{\partial X_1 \partial X_5} \\ \frac{\partial^2 F}{\partial X_2 \partial X_1} & \frac{\partial^2 F}{\partial X_2 \partial X_2} & \frac{\partial^2 F}{\partial X_2 \partial X_3} & \frac{\partial^2 F}{\partial X_2 \partial X_4} & \frac{\partial^2 F}{\partial X_2 \partial X_5} \\ \frac{\partial^2 F}{\partial X_3 \partial X_1} & \frac{\partial^2 F}{\partial X_3 \partial X_2} & \frac{\partial^2 F}{\partial X_3 \partial X_3} & \frac{\partial^2 F}{\partial X_3 \partial X_4} & \frac{\partial^2 F}{\partial X_3 \partial X_5} \\ \frac{\partial^2 F}{\partial X_4 \partial X_1} & \frac{\partial^2 F}{\partial X_4 \partial X_2} & \frac{\partial^2 F}{\partial X_4 \partial X_3} & \frac{\partial^2 F}{\partial X_4 \partial X_4} & \frac{\partial^2 F}{\partial X_4 \partial X_5} \\ \frac{\partial^2 F}{\partial X_5 \partial X_1} & \frac{\partial^2 F}{\partial X_5 \partial X_2} & \frac{\partial^2 F}{\partial X_5 \partial X_3} & \frac{\partial^2 F}{\partial X_5 \partial X_4} & \frac{\partial^2 F}{\partial X_5 \partial X_5} \end{pmatrix} \quad (43)$$

In describing the differentiation of the expanded objective function F with respect to design variable X, it is possible to use Equation (44) to exemplarily illustrate a gradient vector.

[Math. 31]

$$\nabla F(X) = \begin{pmatrix} \frac{\partial F}{\partial X_1} \\ \frac{\partial F}{\partial X_2} \\ \frac{\partial F}{\partial X_3} \\ \frac{\partial F}{\partial X_4} \\ \frac{\partial F}{\partial X_5} \end{pmatrix} = \begin{pmatrix} \frac{F(X_1 + \Delta x) - F(X)}{\Delta x} \\ \frac{F(X_2 + \Delta x) - F(X)}{\Delta x} \\ \frac{F(X_3 + \Delta x) - F(X)}{\Delta x} \\ \frac{F(X_4 + \Delta x) - F(X)}{\Delta x} \\ \frac{F(X_5 + \Delta x) - F(X)}{\Delta x} \end{pmatrix} \quad (44)$$

As described above, with the expanded objective function F, it is necessary to solve the winding equation in accordance with the temporarily set design variable and the like. The objective function f(X) and the penalty function P(X) are obtained from the result of solving the winding equation, and the two are totaled to obtain the expanded objective function F. As such, since the expanded objective function F is not a function in which the design variable X is explicitly expressed as a mathematical expression, it is necessary to employ numerical differentiation instead of differentiation of the expanded objective function F. The method of numerical differentiation is not particularly limited, but, for example, a high-order differential equation having first-order accuracy or second-order accuracy, in accordance with accuracy requirements, can be used. Equation (44) is an example using a differential equation which has first-order accuracy. It is necessary to obtain (a) the derivative of the expanded objective function F(X) with respect to the design variable X, and (b) the derivative of the expanded objective function F(X+ΔX) with respect to a design variable (X+ΔX), where a small increment ΔX has been added to X. As such, in a case where there are five design variables, in order to obtain the gradient vector it is necessary to solve the winding equation a total of six times. In this way, an increase in design variables increases the cost of calculations. A high-order accuracy of differentiation will similarly increase the cost of calculations, and as such the order is preferably first- or second-order.

<Step 3>
In Step 3, it is determined whether or not convergence of calculations has occurred. In a case where the search vector d(k) can be considered to be substantially 0, it is deemed that convergence has occurred, and the calculations end. Otherwise, calculations proceed to Step 4, and Steps 2 through 8 are repeated until d(k)=0.

<Step 4>
When the recursion step is repeated from k to k+1, the design variable is updated from X(k) to X(k+1) in the direction of the search vector d(k). In Step 4, the size by which the search vector d(k) is multiplied is determined. This size is defined as step size Step(k) and can be obtained by using the Armijo rule as shown in Equations (45) and (46).

[Math.32]

$$F\{X[k]+\beta^{lar}d(k)\}-F(X[k])\leq \alpha \cdot \beta^{lar}\nabla F(X[k])^T \cdot d(k) \quad (45)$$

$$\text{Step}(k)=\beta^{lar} \quad (46)$$

Here, α and β are constants from 0 to 1. The smallest non-negative integer lar which satisfies Equation (45) is found, and then the step size Step(k) is obtained from Equation (46).

The right side of Equation (45) includes a gradient vector, where the index T represents a transposed matrix. That is, since the gradient vector is a column vector, the transposed matrix is a row vector. Since the search vector d(k) is a column vector, the right side of Equation (45) is the product of a row vector and a column vector, i.e., a scalar value. The left side of Equation (45) is the difference between expanded objective functions and is a scalar value.

The Armijo rule starts with integer lar at 0, successively increasing to 1 and 2 thereafter, and the first integer to satisfy Equation (45) is found. Note that a smaller value of α corresponds to an increase in speed with which integer lar can be found. As such, α=0.0001 is used here as a non-limiting example. β can be exemplified as 0.5.

<Step 5>
In Step 5, the search vector d(k) obtained in Step 2 and the step size Step(k) obtained in Step 4 are used in Equation (47) to update the design variable from X(k) to X(k+1).

$$X(k+1)=X(k)+\text{Step}(k)\times d(k) \quad (47)$$

<Step 6>
In Step 6, Equation (39) is used to update the penalty coefficient from p(k) to p(k+1).

[Math.33]

$$p(k+1)=p(k)\times c \quad (39)$$

<Step 7>
In Step 7, the Hessian matrix is updated from B(k) to B(k+1). As shown in Equation (43), the Hessian matrix B is obtained by second-order differentiation of the expanded objective function F using the design variable. Using a Newton method to obtain the Hessian matrix B is impractical, as it would cause a great increase in the cost of calculations. To address this issue, the quasi-Newton method as shown in Equation (48) is typically used to render calculations more feasible. The search vector d(k) obtained in Equation (41) uses an inverse matrix H(k) of the Hessian matrix B(k), and thus a BFGS (Broyden-Fletcher-Goldfarb-Shanno) formula is shown for the updating of H(k).

[Math. 34]

$$H(k+1) = H(k) = \frac{H(k)Y(k)(s(k))^T + s(k)(H(k)Y(k))^T}{(s(k))^T Y(k)} + \left(1 + \frac{(Y(k))^T H(k)Y(k)}{(s(k))^T Y(k)}\right)\frac{s(k)(s(k))^T}{(s(k))^T Y(k)} \quad (48)$$

Here, s(k) is a column vector of the difference between design variables X as shown in Equation (49), and Y(k) is a column vector of the difference between gradient vectors ∇F, as shown in Equation (50).

[Math.35]

$$s(k) = X(k+1) - X(k) \quad (49)$$

$$Y(k) = \nabla F(x(k+1)) - \nabla F(x(k)) \quad (50)$$

A unit matrix is used as H(1), a unit matrix being a matrix whose diagonal component is all ones.

<Step 8>

In Step 8, the recursion step k is set to k+1, and calculations return to Step 2.

Convergence is approached by repeating the series of calculations of Steps 1 through 8. The number of recursion steps required for convergence differs depending on, for example, the initial value of the design variable, but will typically be in an approximate range from several times to ten times. Note that in order to avoid a local optimal solution and find a global optimal solution, the initial value can be altered a number of times to confirm that the same solution is obtained.

EXAMPLES

The following methods were used to measure physical property values of (a) the respective separator rolls (film rolls) produced in the following Example and Comparative Example, and (b) the respective cores and nonaqueous electrolyte secondary battery separators (films) constituting the separator rolls.

[Size of Core and Nonaqueous Electrolyte Secondary Battery Separator]

Thickness of the nonaqueous electrolyte secondary battery separator was measured in conformance with JISK7130 (Plastics—Film and sheeting—Determination of thickness). A high-accuracy digital length measuring machine manufactured by Mitutoyo Corporation was used. Length of the separator was measured using an encoder length measuring apparatus. All other dimensions were measured using a slide caliper.

[Critical Stress of Core]

In a simulation using elastic theory and finite element analysis, external pressure was applied to a core, prior to winding of the nonaqueous electrolyte secondary battery separator, to calculate an amount of stress which would cause the core to yield. As a result, it was found that in a case where a stress of 2.0 MPa is applied, a maximum value of Von Mises stress in the core was 40 MPa, which is the yield stress of the ABS resin used as the material of the core. The value of applied external force was multiplied by a safety factor of 0.5, and the critical stress $\sigma_{cr}$ of the core was calculated to be 1.0 MPa.

[Radial Young's Modulus of Core]

The radial Young's modulus of the core was calculated via a simulation using elastic theory and finite element analysis. The conditions of the simulation are as follows.

Core material: ABS resin (tensile Young's modulus: 2 GPa; Poisson's ratio: 0.36)

Core form: innermost diameter: 75 mm; inner circumferential part thickness: 5.4 mm Outermost diameter: 152 mm; outer circumferential part thickness: 5.9 mm Ribs: total of eight, provided at intervals of 45'; thickness: 5.4 mm; width: 65 mm

[Young's Modulus of Nonaqueous Electrolyte Secondary Battery Separator]

Figure 3:
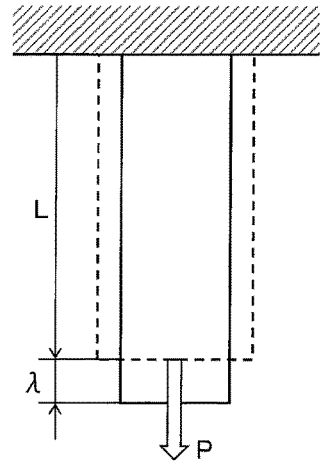
FIG. 3 is a diagram schematically illustrating a method of measuring the tangential Young's modulus $E_t$ of a film roll. Citation from p. 166 of Non-Patent Literature 1.
Figure 3:
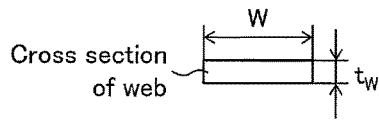
Figure 3:
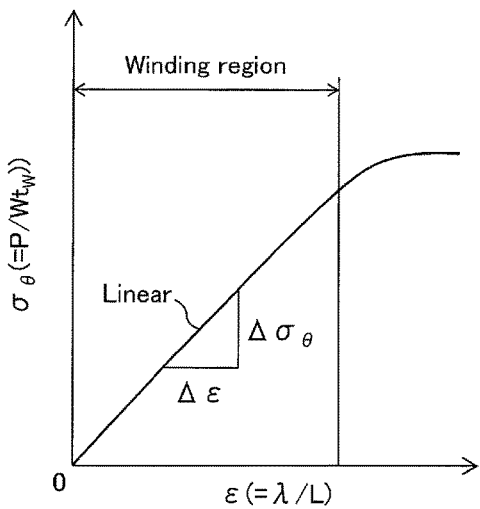
Figure 3:
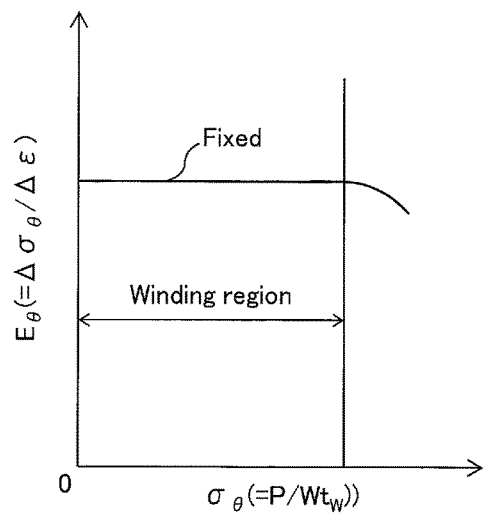
Figure 4:
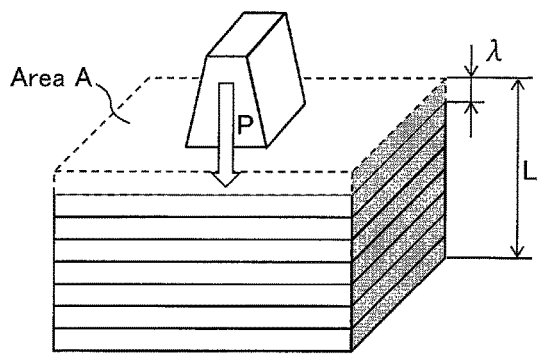
FIG. 4 is a diagram schematically illustrating a method of measuring the radial Young's modulus $E_r$ in a film roll. Citation from p. 166 of Non-Patent Literature 1.
Figure 4:
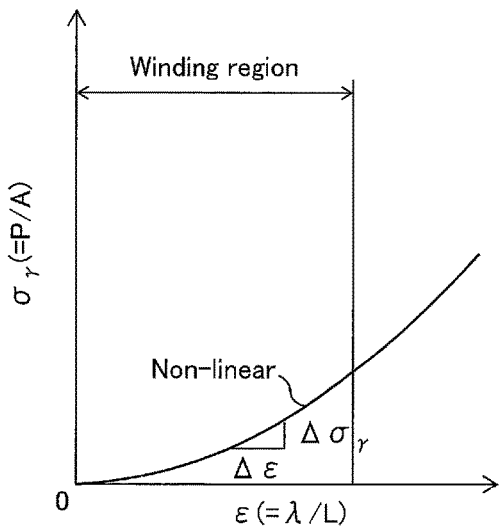
Figure 4:
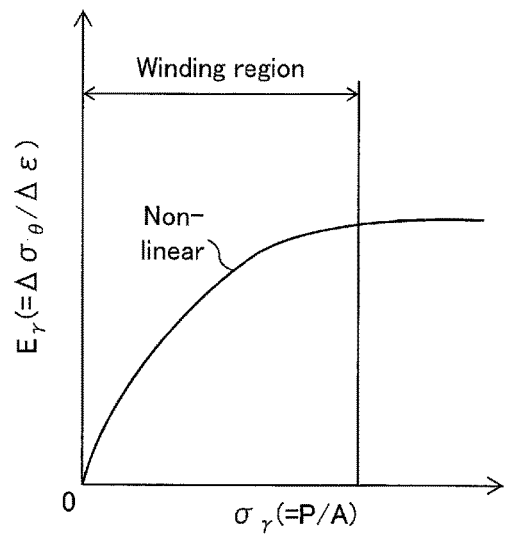

A tangential Young's modulus $E_t$ and a radial Young's modulus $E_r$ of the nonaqueous electrolyte secondary battery separator was measured via a tension test and a compression test as shown in FIG. 3 and FIG. 4, respectively. Measurement apparatuses and measurement conditions used in the tests are as follows.

Tension Test:

Measurement apparatus: Manufactured by INSTRON, model no. 5982

Measurement conditions: In conformance with JIS K 7127 (Plastics—Determination of Tensile Properties—Part 3: Test Conditions for Films and Sheets) and JIS K 7161 (Plastics—Determination Of Tensile Properties—Part 1: General Principles). Pulling speed: 10 mm/min.

Test specimen: JIS K 7127 Type 1B.

Compression Test:

Measurement apparatus: Manufactured by INSTRON, model no. 5982

Measurement conditions: In conformance with JIS K 7181 (Plastics—Determination of Compressive Properties). Compression speed: 1.2 mm/min.

Test specimen: 150 mm (length)×60.9 mm (width)×20 mm (thickness) (approx. 1,200 separator layers).

[Strain of Core]

For the separator roll obtained in Comparative Example 1, strain of the core thereof was measured as follows. First, the radius ($R_0$) of the core prior to winding was measured with a slide caliper and was found to be 76.0 mm. This figure is an average of eight measurements performed, specifically four measurements at a midpoint between each of the eight ribs, and four measurements at rib heads. Once the separator roll was obtained, similar measurements were performed to find the radius ($R_1$) of the core, and strain of the core was obtained as $(R_0-R_1)/R_0$.

[Analysis Method]

The foregoing analysis method was used to analyze (a) radial stress $\sigma_r$, (b) tangential stress $\sigma_t$, and (c) frictional force F between layers of the nonaqueous electrolyte secondary battery separator, with respect to the distribution of the winding tension $T_w$ at a radial position ($R/R_c$).

Example 1 and Comparative Example 1

Figure 7:
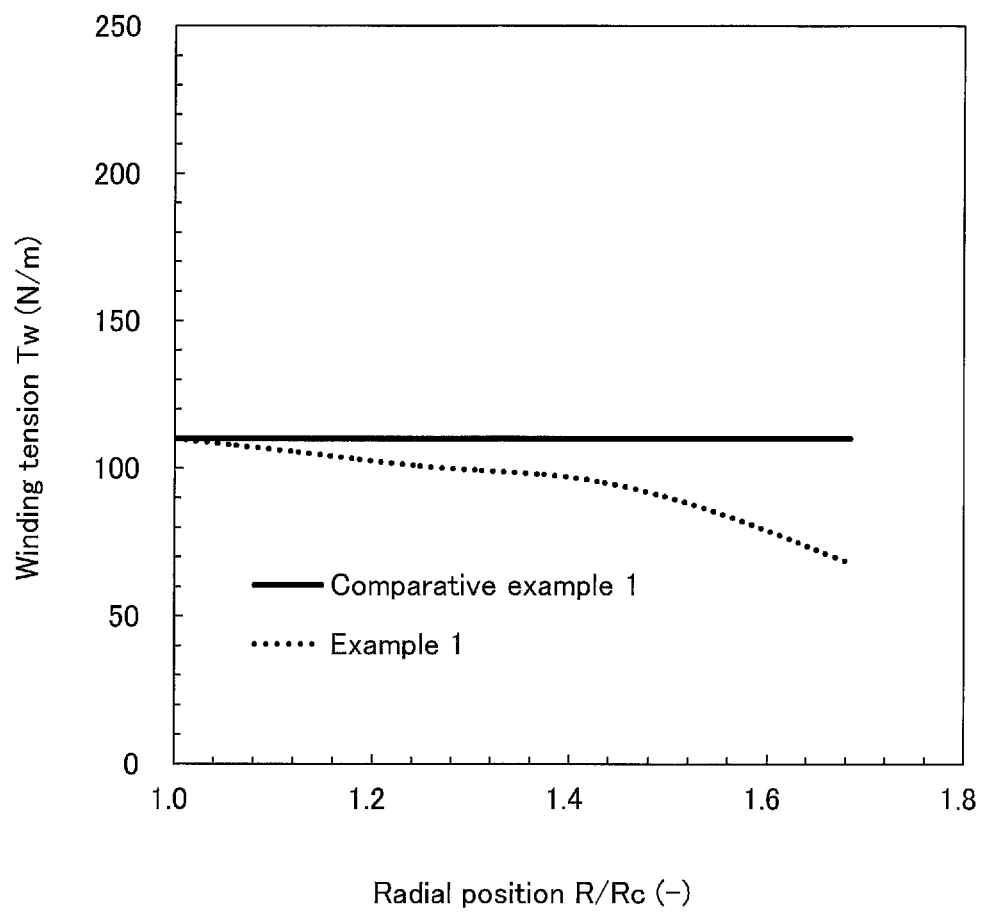
FIG. 7 is a graph showing a relation between a radial position $R/R_c$ and winding tension, with respect to Example 1 and Comparative Example 1.

A separator roll was produced in each of Example 1 and Comparative Example 1 as follows. A core made from ABS resin was fixed to a winding spindle of a winding machine, the winding machine being a centrally-driven winding system having a nip roller. The core was then made to rotate such that a nonaqueous electrolyte secondary battery separator was wound therearound. During the winding, the winding tension applied to the respective nonaqueous electrolyte secondary battery separators of the Example and the Comparative Example was adjusted, as shown in FIG. 7, by controlling the rotation speed of a motor driving the winding spindle.

In Example 1 and the Comparative Example 1, various parameters, including (a) the physical properties of the core, (b) the physical property values of the nip roller of the winding machine and (c) the physical properties of the nonaqueous electrolyte secondary battery separator were as shown in Tables 1 and 2 below.

TABLE 1

| | | Example 1 and Comparative Example 1 |
|---|---|---|
| Core | Young's modulus (Pa) | −2.56E+08 |
| | Radius (m) | 0.076 |
| Nip roller | Poisson's ratio (−) | 0.3 |
| | Young's modulus (Pa) | 2.06E+11 |
| | Radius (m) | 0.03 |
| Nonaqueous electrolyte secondary battery separator | Composite root square roughness (μm) | 0.36 |
| | Coefficient of static friction (−) | 0.3 |
| | Thickness (μm) | 16.5 |
| | Width (m) | 0.0609 |
| | Poisson's ratio (−) | 0 |
| | Tangential Young's modulus (Pa) | 1.35E+10 |
| | Radial Young's modulus parameter C0 (Pa) | 4.42E+07 |
| | Radial Young's modulus parameter C1 (Pa) | 1.45E+05 |

TABLE 2

| Parameter | Unit | Value |
|---|---|---|
| Air viscosity | Pa · s | 1.82200E−05 |
| Atmospheric pressure | Pa | 1.01325E+05 |
| Critical frictional force | N | 140 |
| Nip load | N | 15 |
| Winding speed | m/s | 1.67 |

Table 3 below shows (a) the properties of the nonaqueous electrolyte secondary battery separator used, (b) the critical stress of the core, (c) an overview of winding conditions, (d) strain of the core of the obtained separator roll, and (e) an absolute value of radial stress applied to the core. With regards to the strain of the core, since the actual measured value and the calculated value of Comparative Example 1 were quantitatively matched, only the calculated value of the strain of the core is shown for Example 1.

gential stress $\sigma_t$, and (e) frictional force F between layers of the nonaqueous electrolyte secondary battery separator. The results of this analysis are shown in FIGS. 7 through 10.

[Conclusion]

From Table 3 and FIGS. 7 through 10, it is shown that radial stress applied to the core of the separator roll obtained in Example 1 was equal to or less than the critical stress of the core.

Figure 9:
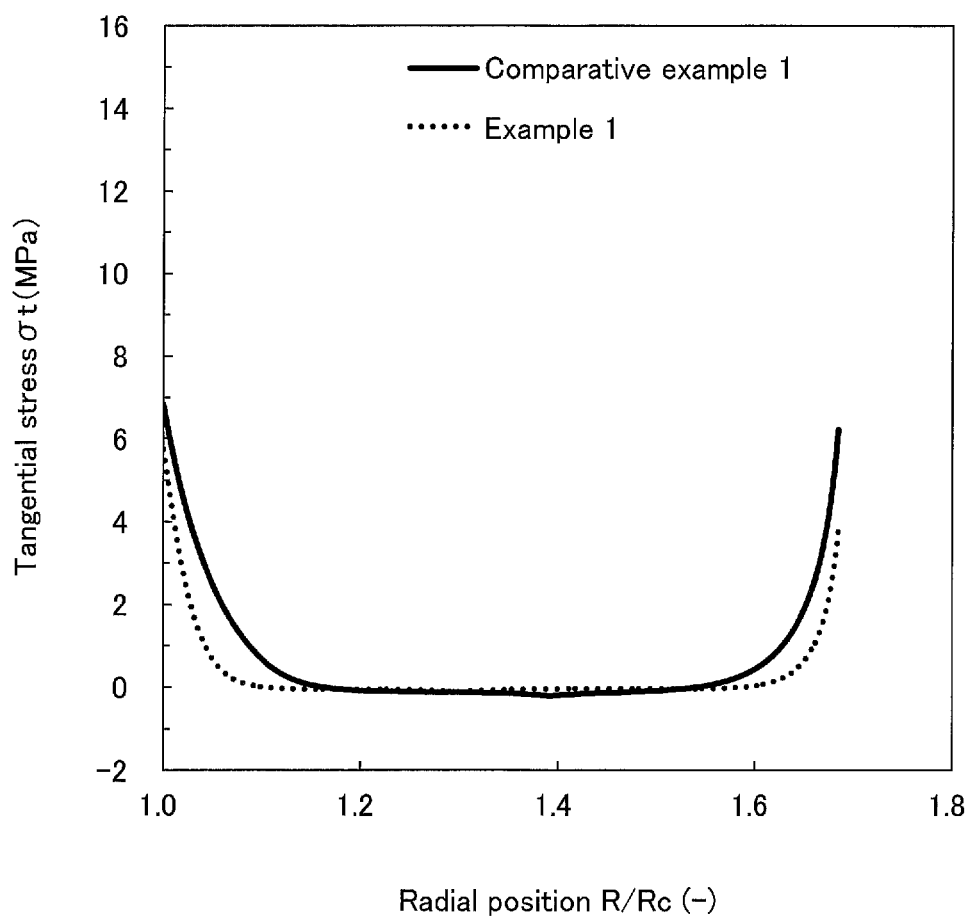
FIG. 9 is a graph showing a relation between the radial position $R/Rc$ and an absolute value of tangential stress $\sigma_t$, with respect to Example 1 and Comparative Example 1.

From FIGS. 7 and 9, it was found that in the respective separator rolls of Example 1 and Comparative Example 1, tangential stress was 0 or a positive value, i.e., a non-negative value. It was also found that, with the exception of the vicinities of the core and of the outermost layer, tangential stress near a middle of the separator rolls was nearly zero, and the occurrence of creep was therefore inhibited.

Figure 10:
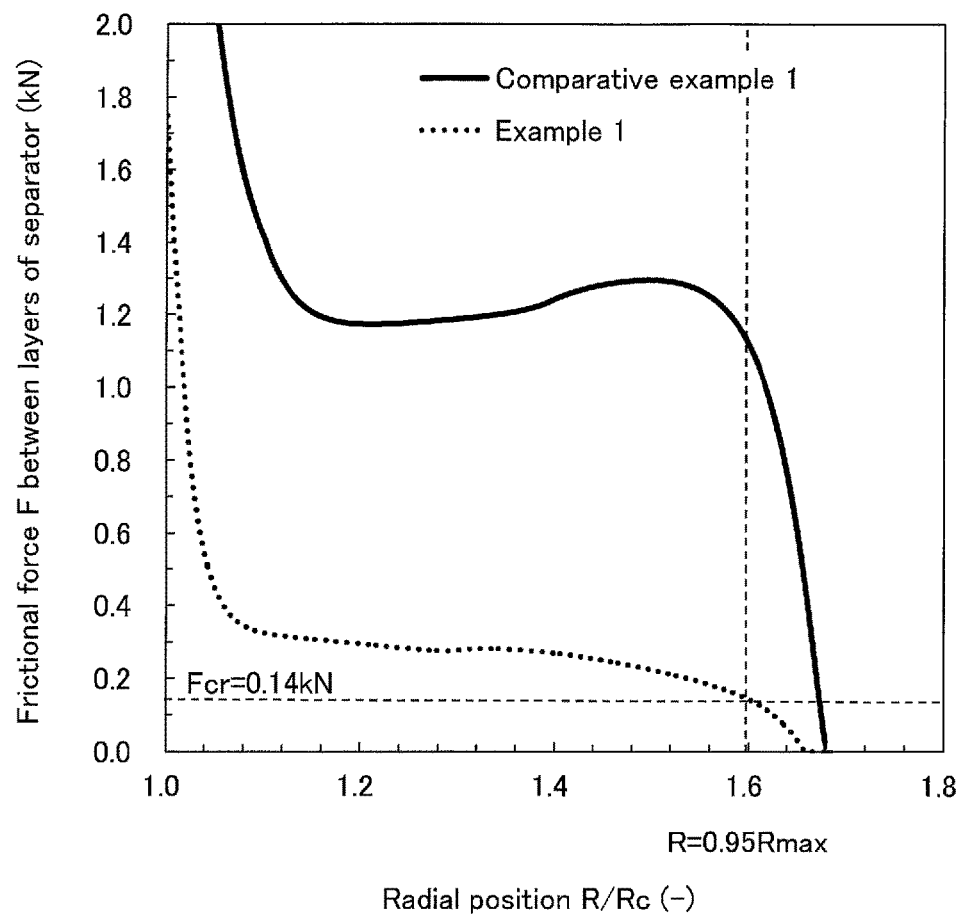
FIG. 10 is a graph showing a relation between the radial position $R/Rc$ and a frictional force between layers of film, with respect to Example 1 and Comparative Example 1.

From FIGS. 7 and 10, it was further found that the separator roll of Comparative Example 1, where the winding tension was not optimized through nonlinear programming, exhibited excessive frictional force between the layers of the nonaqueous electrolyte secondary battery separator. With regard to Example 1, on the other hand, it was found that, since an optimized tension distribution was used, the constraint conditions of the nonlinear programming were followed, and thus critical frictional force was accurately maintained at a position equivalent to 95% of the maximum winding radius.

The above matters indicate that, by winding a nonaqueous electrolyte secondary battery separator around a core at a suitably adjusted winding tension, it is possible to produce a separator roll in which an absolute value of radial stress applied to the core is equal to or less than the critical stress of the core.

The above matters also indicate that, in a separator roll in which the absolute value of the radial stress applied to the core is equal to or less than the critical stress of the core, tangential stress is also adjusted to a suitable range, and of the exterior of the separator roll is therefore has superior quality.

Furthermore, the above matters indicate that by optimizing winding tension by use of nonlinear programming, it is possible to suitably adjust frictional force. That is, by optimizing winding tension by use of nonlinear programming, it is possible to further improve the quality of the exterior of a separator roll.

TABLE 3

| | Separator properties | | | Winding conditions | | | | Winding results | | |
|---|---|---|---|---|---|---|---|---|---|---|
| | | | | | | | | | Core strain | |
| | Et Pa | Er ($|\sigma_r|$ = 1000 Pa) Pa | Et/Er — | Initial winding tension N/m | Tension distribution | Winding length m | Max. winding radius m | Core Critical stress $\sigma_{cr}$ Mpa | Absolute value of radial stress $|\sigma_r|$ applied to core Mpa | Actual measured value | Calculated value |
| Comparative Example 1 | 1.35E+10 | 3.04E+05 | 4.44E+04 | 110 | Fixed tension | 2000 | 0.128 | 1.0 | 0.46 | 1.9E−03 | 1.8E−03 |
| Example 1 | | | | | Optimized | | | | 0.20 | — | 7.8E−04 |

Furthermore, analysis was performed to determine relations, at a given distance R from the center of the core of the separator rolls obtained, between (a) a radial position (R/R$_c$) with respect to the radius R$_c$ of core and each of (b) winding tension T$_w$, (c) absolute value of radial stress $\sigma_r$, (d) tan- As such, it was found that it is possible to prevent deformation of the core and produce a separator roll whose exterior is superior in quality by (a) adjusting winding tension, in accordance with the Young's modulus of the nonaqueous electrolyte secondary battery separator, such that the absolute value of radial stress applied to the core is equal to or less than the critical stress of the core, and (b) winding the nonaqueous electrolyte secondary battery separator around the core at the winding tension adjusted thusly.

[Effect of Embodiment 1]

Figure 11:
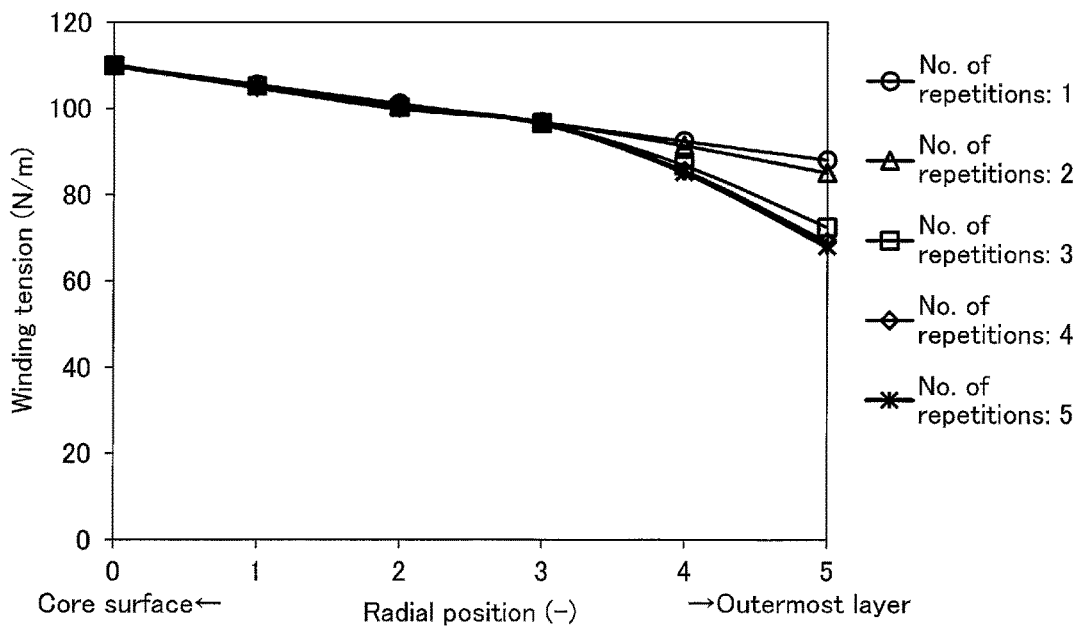
FIG. 11 is a graph showing a winding tension distribution function calculated by a calculation device included in the film winding device of FIG. 5.

FIG. 11 is a graph showing a winding tension distribution function calculated by the calculation device 40 included in the film winding device 20 of FIG. 5. By repeating the above-described Steps 1 through 8, the calculation device 40 calculates a winding tension distribution function where the search vector d(k), for minimizing the value of the expanded objective function shown in Equation (29), is substantially 0. The search vector d(k) being substantially 0 means that the design variable X will not change further. In FIG. 11, a graphed line of "no. of repetitions: i" (in the example of FIG. 11, i=1~5) represents the winding tension distribution function in a case where the number of recursion steps k, i.e., the number of times Steps 1 through 8 are repeated, is i.

Figure 12:
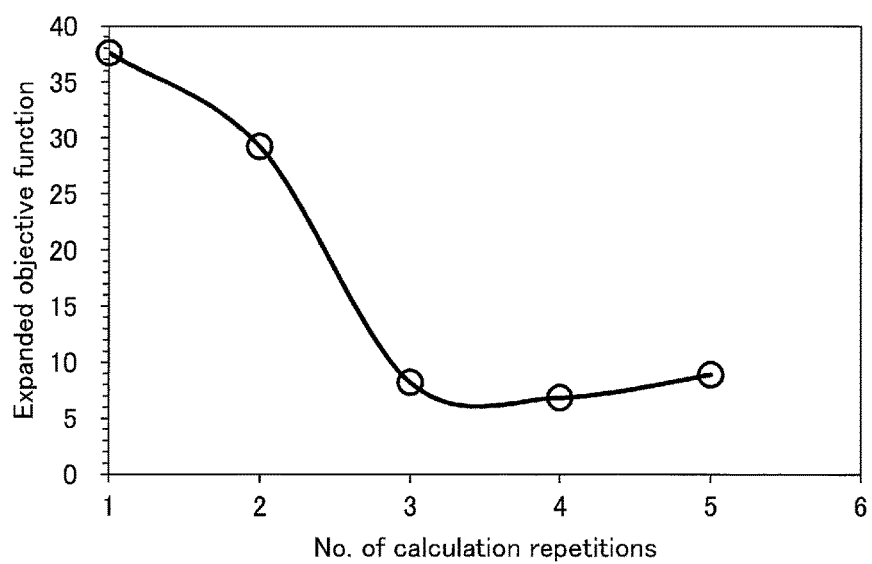
FIG. 12 is a graph showing a change in the value of an expanded objective function in optimization of the winding tension distribution function shown in FIG. 11.

FIG. 12 is a graph showing a change in the value of the expanded objective function F(X) in optimization of the winding tension distribution function shown in FIG. 11. The expanded objective function F(X) sharply decreases in value at the third repetition, and then gradually approaches convergence.

Figure 13:
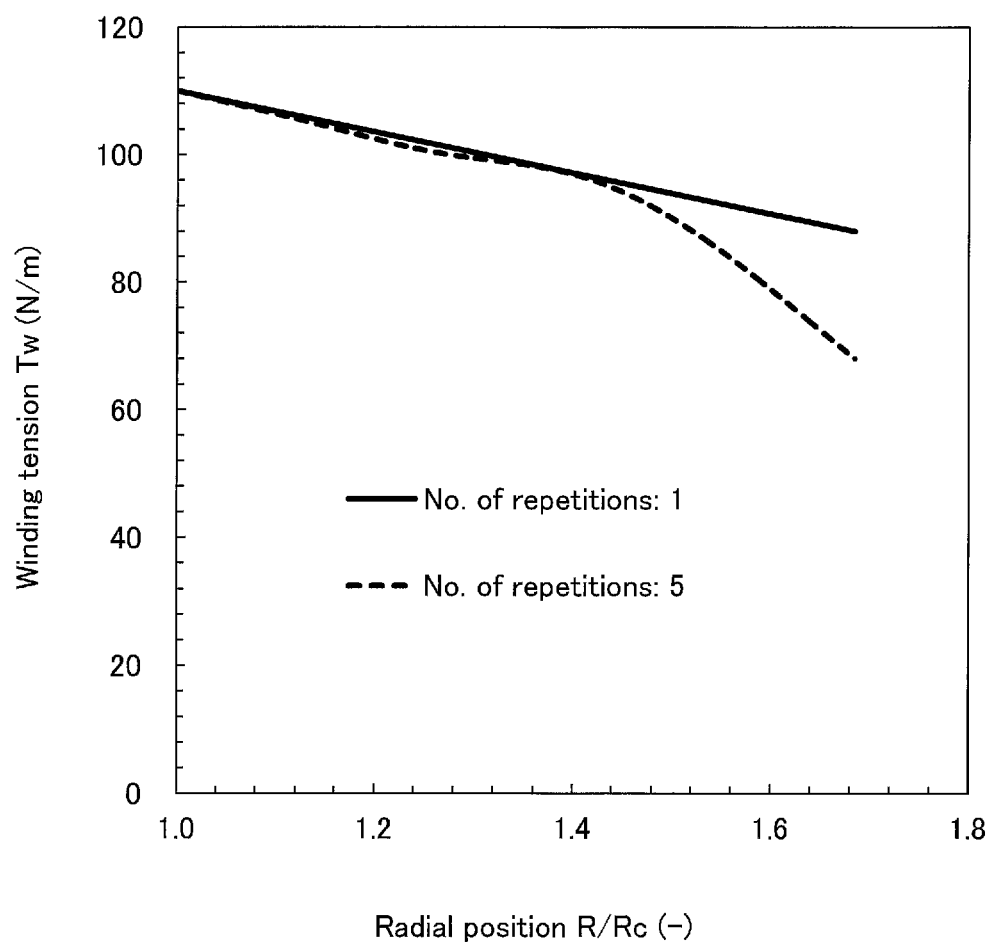
FIG. 13 is a graph showing a relation between the radial position R/R$_c$ and winding tension T$_w$ in optimization of the winding tension distribution function shown in FIG. 11.

FIG. 13 is a graph showing a relation between the radial position $R/R_c$ and the winding tension $T_w$ in optimization of the winding tension distribution function shown in FIG. 11. The graphed line of "no. of repetitions: 5" corresponds to Example 1. In the below-described drawings and graphs as well, the graphed line of "no. of repetitions: 5" corresponds to Example 1.

In the film winding device 20 of FIG. 5, the design variable X is updated in order to minimize the expanded objective function F(X). The winding tension adjustment device 22 controls the rotation speed of the take-up roller in accordance with the winding tension distribution function (optimized winding tension function) obtained when the design variable X no longer changes upon being updated. This brings about the following effects.

Figure 15:
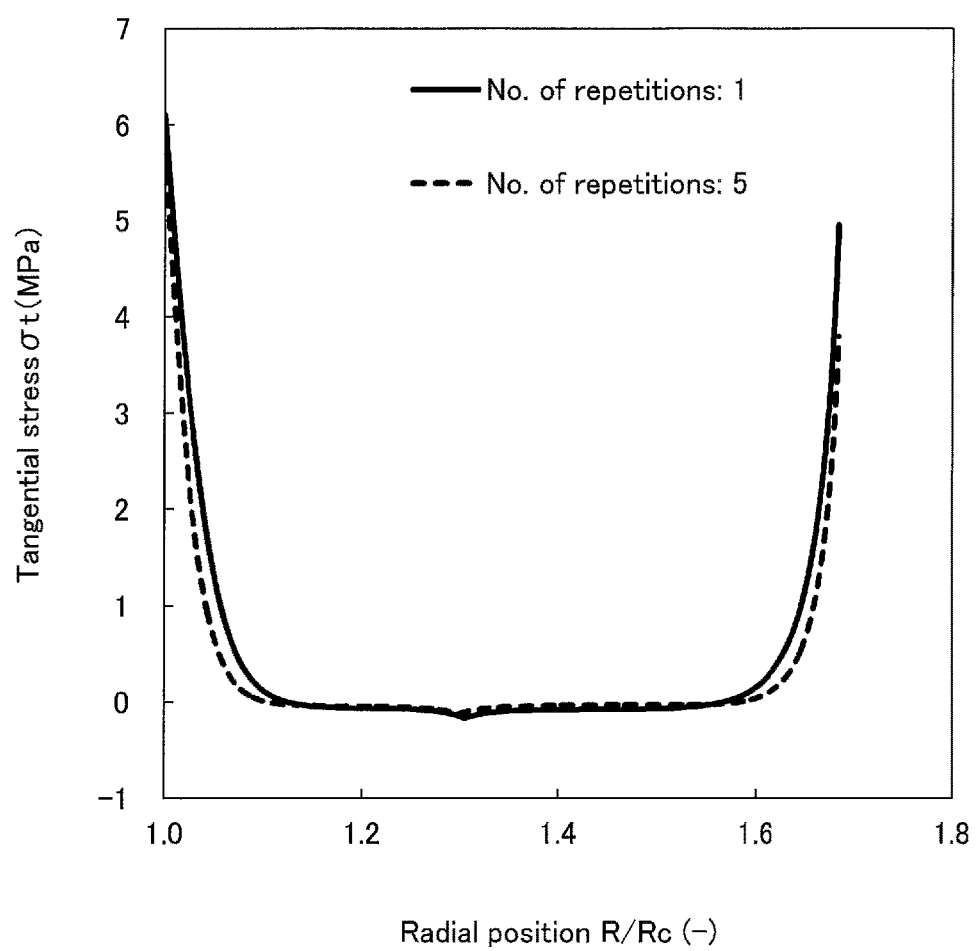
FIG. 15 is a graph showing a relation between the radial position R/Rc and tangential stress $\sigma_r$ in optimization of the winding tension distribution function shown in FIG. 11.

(1) As shown in FIG. 9 and FIG. 15, it is possible to maintain tangential stress of a film in a film roll so as to be a non-negative value. As such, it is possible to inhibit wrinkling, i.e., a defect in which the film wound around the core has waves.

Figure 16:
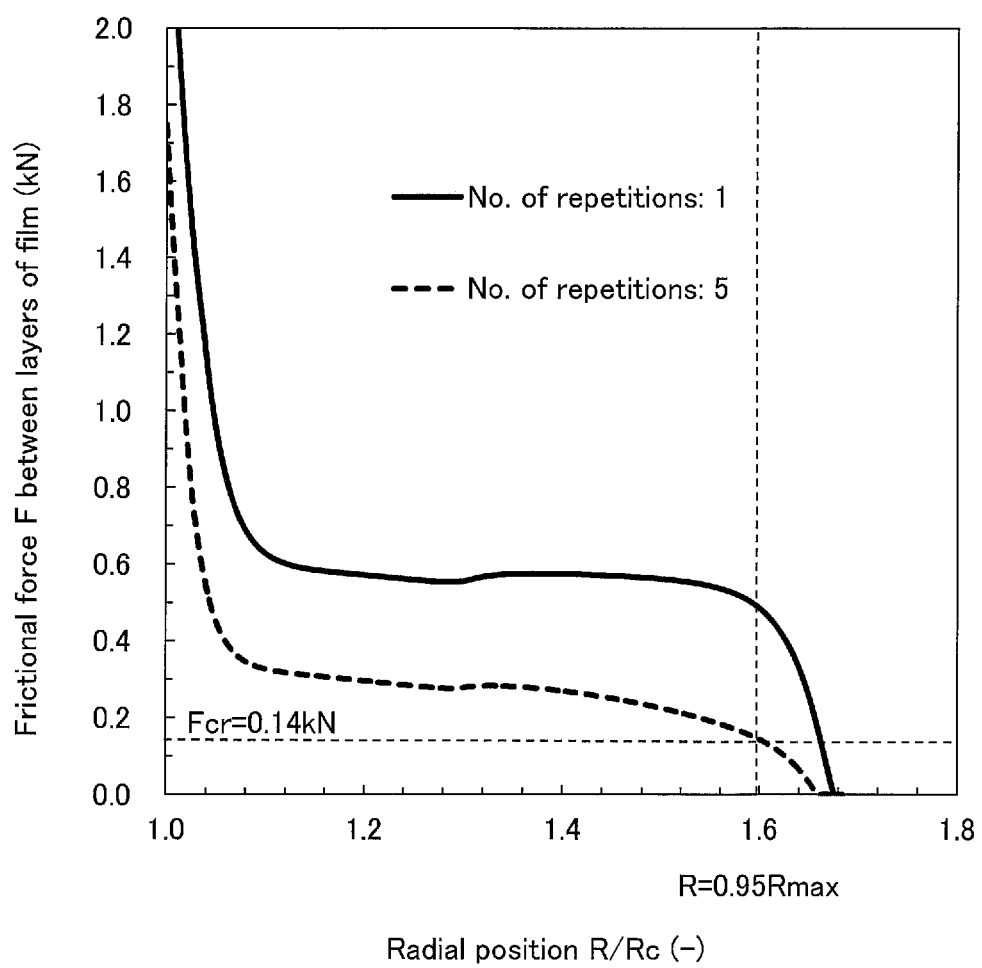
FIG. 16 is a graph showing a relation between the radial position R/Rc and frictional force F between layers of film in optimization of the winding tension distribution function shown in FIG. 11.

(2) As shown in FIG. 10 and FIG. 16, it is possible to maintain the frictional force between layers of film so as to be greater than the critical frictional force F, (0.14 kN), even at a position equivalent to 95% of the maximum winding radius (0.95 Rmax) of the film roll. As such, it is possible to inhibit slippage, i.e., a defect in which the film wound around the core slips in the width direction of the core. Note that the critical frictional force is equivalent to an impact force of a maximum acceleration during transport of the film roll (for example, a value obtained by multiplying the mass of the film roll by an acceleration equal to ten times gravity (10G)). It is therefore possible to achieve a film roll suitable for transport.

Figure 8:
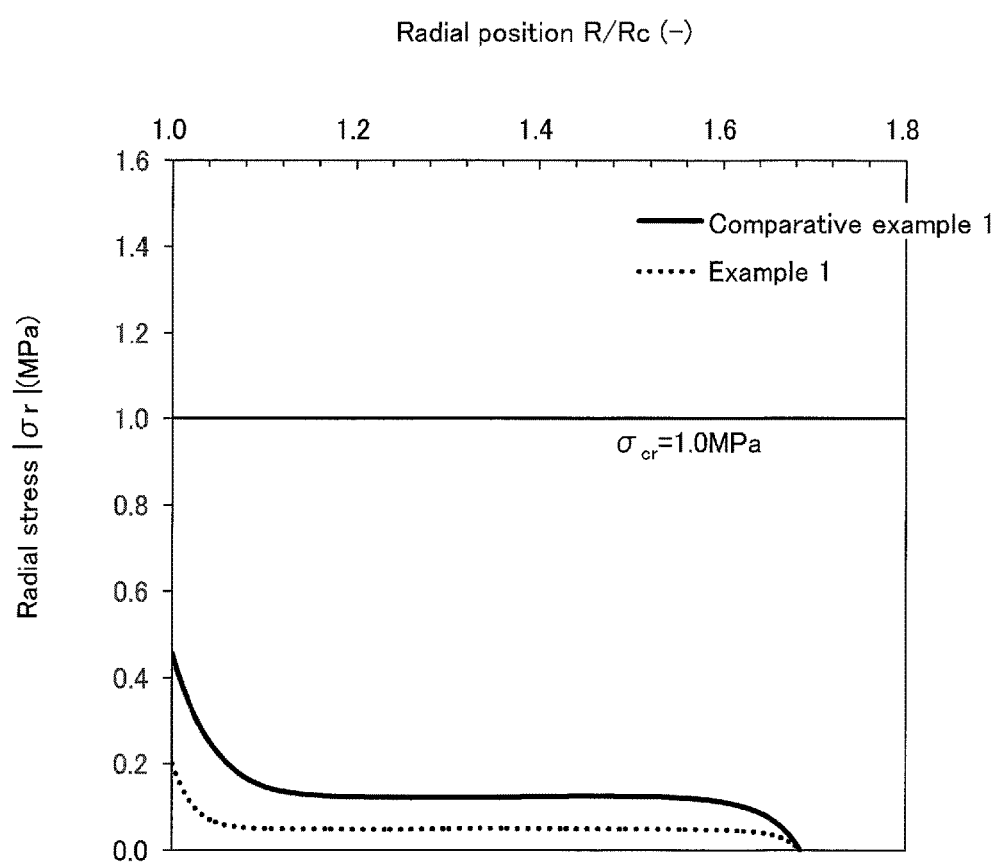
FIG. 8 is a graph showing a relation between the radial position $R/R_c$ and radial stress $\sigma_r$, with respect to Example 1 and Comparative Example 1.

(3) As shown in FIG. 8 and FIG. 14, it is possible to maintain an optimized radial stress (Example 1 of FIG. 8, and "no. of repetitions: 5" in FIG. 14) of the film in the film roll so as to be less than a non-optimized radial stress thereof (Comparative Example 1 of FIG. 8, and "no. of repetitions: 1" in FIG. 14). As such, it is possible to inhibit creep, i.e., a defect in which the film wound around the core deforms and then (a) exhibits curving when wound off from the core, or (b) retains deformation, caused by compression and tension, when wound off from the core. Furthermore, it is possible to ameliorate deformation and stress cracking of the core.

(Objects to be Wrapped Around Core)

The film 12 is produced so as to initially have a width greater than that of a final product to be sold. This is done to improve productivity. After being initially produced, the film 12 is cut (slit) to the width of the final product. With the film winding device 20 of FIG. 5, the object to be wrapped around the core is not limited to a film that has been slit, and can be a wider film which has not yet been slit (i.e., a so-called "original sheet").

With the film winding device 20 of FIG. 5, the object to be wrapped around the core is not limited to being an nonaqueous electrolyte secondary battery separator, and can be, for example, (a) an optical film such as a polyvinyl alcohol resin film or a polarizing film made from a polyvinyl alcohol resin film, (b) a general-use film having polypropylene (PP), polyethylene (PE), or polyethylene terephthalate (PET) as a main component, (c) a film for food packaging, or (d) a film for agricultural use.

(Film Roll)

The present invention also encompasses a film roll having a radial stress $\sigma_r$ distribution as disclosed in Example 1 of FIG. 8 or "no. of repetitions: 5" of FIG. 14. That is, the present invention encompasses a film roll having a radial stress $\sigma_r$ distribution obtained by solving Winding Equation (8) in accordance with the winding tension distribution function as obtained in a case where the design variable X no longer changes upon being updated to minimize the expanded objective function F(X), as in the film winding device 20 of FIG. 5. In other words, the Winding Equation (8) is solved in accordance with the winding tension $T_w$ of Example 1 of FIG. 7 or "no. of repetitions: 5" of FIG. 13. A film roll having such a radial stress $\sigma_r$ distribution is obtained by winding the film 12 around the core at the winding tension $T_w$ of Example 1 of FIG. 7 or "no. of repetitions: 5" of FIG. 13. Such a film roll has a tangential stress $\sigma_t$ distribution as in Example 1 of FIG. 9 or "no. of repetitions: 5" of FIG. 15. The film roll also has a distribution of frictional force F between layers of film as in Example 1 of FIG. 10 or "no. of repetitions: 5" of FIG. 16.

(Material of Core)

Examples of the material of the core encompass thermoplastic resins such as acrylonitrile-butadiene-styrene copolymer (ABS) resin, PP resin, polyvinyl chloride (PVC) resin, polystyrene (PS) resin, and polycarbonate (PC) resin. These thermoplastic resins can contain an additive such as a filler or antistatic agent in order to impart functionality such as rigidity or an antistatic property.

(Rollers of Film Winding Device)

In order to facilitate the optimization of the winding tension distribution function, the various rollers included in the film winding device 20 of FIG. 5 are more preferably not free rollers, but rather speed-adjustable driven rollers. This is because free rollers have bearings whose frictional drag is likely to cause difficulty in conveyance during winding at low winding tensions. Furthermore, with regards to the nip roller, in a case where the load placed on the film 12 is to be altered during winding and the nip load distribution is to be optimized, it is preferable to use variable-load device. For example, it is preferable to use a device, including a pneumatic compression cylinder, for which pneumatic pressure can be controlled during winding.

[Recap]

A method in accordance with an aspect of the present invention is a method for controlling a film winding device, the film winding device including at least: a rotation driving device for rotating a core around which a film is wound; and a winding tension adjustment device for adjusting a winding tension with which the film is wound around the core, in which method the winding tension adjustment device is controlled in accordance with an optimized winding tension function, the optimized winding tension function being obtained by use of nonlinear programming which utilizes a winding equation, the winding equation including: a stress function which expresses a radial stress of the film in a film roll, the film roll being constituted by the core and the film wound around the core; and a winding tension function which expresses the winding tension as a function of a coordinate in a radial direction of the core, the winding tension function being explicitly expressed in the winding equation, the optimized winding tension function being the winding tension function as obtained in a case where a design variable no longer changes when the design variable is updated to minimize a value of an expanded objective function, the design variable representing a plurality of values of the winding tension function at a plurality of positions at which a radius of the film roll is divided, the expanded objective function being obtained by adding: (1) an objective function which includes, as parameters, at least (a) a tangential stress in the film roll and (b) a frictional force between layers of the film; and (2) a penalty function in accordance with constraint condition functions which (c) constrain a minimum value of the tangential stress to be a non-negative value and (d) constrain the frictional force to be not less than a critical frictional force at which slippage of the film occurs.

With the above configuration, the winding tension adjustment device controls the rotation driving device in accordance with the optimized winding tension function. The optimized winding tension function is the winding tension function as obtained in a case where the design variable does not change upon being updated to minimize the expanded objective function. This enables the winding tension adjustment device to adjust the winding tension with which the film is wound around the core. This brings about the following effects.

(1) It is possible to maintain the tangential stress of the film in the film roll so as to be a non-negative value. As such, it is possible to inhibit wrinkling, i.e., a defect in which the film wound around the core has waves.

(2) It is possible to maintain the frictional force between layers of the film so as to be greater than the critical frictional force. As such, it is possible to inhibit slippage, i.e., a defect in which the film wound around the core slips in the width direction of the core.

(3) It is possible to maintain the radial stress of the film in the of film roll so as to be less than the radial stress of a film in a film roll obtained in accordance with a conventional winding tension function. It is also possible to reduce the tangential stress of the film of the film roll to be nearly zero near the middle of the film roll. As such, it is possible to inhibit creep, i.e., a defect in which, in a case where the thickness of the film wound around the core varies in the width direction, the film wound around the core deforms and then (a) exhibits curving when wound off from the core, or (b) retains deformation, caused by compression and tension, when wound off from the core.

Note that wrinkling may also be called a "star defect", and slippage may also be called "telescoping".

It is not necessary for the film winding device itself to perform the calculations for finding the winding tension function for which the design variable no longer changes upon being updated to minimize the expanded objective function. The winding tension function can be obtained by, for example, a calculation device provided externally to the film winding device. Note that the present invention also encompasses a method for controlling a film winding device which adjusts a winding tension adjustment device in accordance with a winding tension function that is equivalent to a winding tension function as obtained in a case where the design variable no longer changes upon being updated to minimize the expanded objective function.

The film can be a film that has been slit or a wider film which has not yet been slit (i.e., a so-called original sheet). The film is not particularly limited, and can be, for example, (a) a nonaqueous electrolyte secondary battery separator, (b) an optical film such as a polyvinyl alcohol resin film or a polarizing film made from a polyvinyl alcohol resin film, (c) a general-use film having polypropylene (PP), polyethylene (PE), or polyethylene terephthalate (PET) as a main component, (d) a film for food packaging, or (e) a film for agricultural use.

Examples of the material of the core encompass thermoplastic resins such as acrylonitrile-butadiene-styrene copolymer (ABS) resin, PP resin, polyvinyl chloride (PVC) resin, polystyrene (PS) resin, and polycarbonate (PC) resin. These thermoplastic resins can contain an additive such as a filler or antistatic agent in order to impart functionality such as rigidity or an antistatic property.

The expanded objective function preferably has a value which is obtained by solving the winding equation in accordance with the design variable.

It is preferable that: (a) a function expressing the tangential stress and (b) a function expressing the frictional force are each a function of the stress function; the stress function is obtained by establishing a value of the winding tension function in accordance with the design variable and subsequently solving the winding equation; and a value of the expanded objective function is obtained from (c) the tangential stress and (d) the frictional force.

It is preferable that radial stress applied to the core has an absolute value which is not more than a critical stress.

Here, the critical stress is a value obtained by multiplying (a) the absolute value of radial stress applied to the core by (b) a safety factor 0.5, in a case where a maximum value of Von Mises stress in the core is equivalent to a yield stress of the material of the core.

It is preferable that at a radial position corresponding to 95% of a radius at an outermost layer of the film roll, the frictional force between the layers of the film is not less than a value obtained by multiplying (a) a mass of the film roll and (b) an acceleration equivalent to ten times gravity.

A film roll in accordance with an aspect of the present invention is a film roll including a core and a film wound around the core, in which: the film roll has a radial stress distribution obtained by use of nonlinear programming which utilizes a winding equation, the winding equation including: a stress function which expresses a radial stress of the film in the film roll; and a winding tension function which expresses the winding tension as a function of a coordinate in a radial direction of the core, the winding tension function being explicitly expressed in the winding equation, the radial stress distribution being expressed by the stress function as obtained by solving the winding equation in accordance with an optimized winding tension function, the optimized winding tension function being the winding tension function as obtained in a case where a design variable no longer changes when the design variable is updated to minimize a value of an expanded objective function, the design variable representing a plurality of values of the winding tension function at a plurality of positions at which a radius of the film roll is divided, the expanded objective function being obtained by adding: (1) an objective function which includes, as parameters, at least (a) a tangential stress in the film roll and (b) a frictional force between layers of the film; and (2) a penalty function in accordance with constraint condition functions which (c) constrain a minimum value of the tangential stress to be a non-negative value and (d) constrain the frictional force to be not less than a critical frictional force at which slippage of the film occurs.

A film winding device in accordance with an aspect of the present invention is a film winding device including at least: a rotation driving device for rotating a core around which a film is wound; and a winding tension adjustment device for adjusting a winding tension with which the film is wound around the core, the film winding device controlling the winding tension adjustment device in accordance with an optimized winding tension function, the optimized winding tension function being obtained by use of nonlinear programming which utilizes a winding equation, the winding equation including: a stress function which expresses a radial stress of the film in a film roll, the film roll being constituted by the core and the film wound around the core; and a winding tension function which expresses the winding tension as a function of a coordinate in a radial direction of the core, the winding tension function being explicitly expressed in the winding equation, the optimized winding tension function being the winding tension function as obtained in a case where a design variable no longer changes when the design variable is updated to minimize a value of an expanded objective function, the design variable representing a plurality of values of the winding tension function at a plurality of positions at which a radius of the film roll is divided, the expanded objective function being obtained by adding: (1) an objective function which includes, as parameters, at least (a) a tangential stress in the film roll and (b) a frictional force between layers of the film; and (2) a penalty function in accordance with constraint condition functions which (c) constrain a minimum value of the tangential stress to be a non-negative value and (d) constrain the frictional force to be not less than a critical frictional force at which slippage of the film occurs.

[Additional Remarks]

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

An embodiment of the present invention can be used in the production of a film roll in which deformation of the core is inhibited and which has superior quality, including quality which is externally manifested and that which is not. A film roll in accordance with an embodiment of the present invention has superior quality, including quality which is externally manifested and that which is not, and is suited for transportation and storage. The film roll can therefore be applied for more efficient production of a nonaqueous electrolyte secondary battery or the like.

REFERENCE SIGNS LIST

12 Film
20 Film winding device
21 Take-up roller (rotation driving device)
22 Winding tension adjustment device
13 Nip roller
40 Calculation device
F(X) Expanded objective function
P(X) Penalty function
$T_w(r)$ Winding tension distribution function (winding tension function)
g(X) Constraint condition functions
$\sigma_r$ Radial stress
$\sigma_r(r)$ Stress distribution (stress function)
$\sigma_t$ Tangential stress

The invention claimed is:

1. A method for controlling a film winding device, the film winding device including at least:
   a rotation driving device for rotating a core around which a film is wound; and
   a winding tension adjustment device for adjusting a winding tension with which the film is wound around the core,
   wherein the winding tension adjustment device is controlled in accordance with an optimized winding tension function,
   the optimized winding tension function being obtained by use of nonlinear programming which utilizes a winding equation, the winding equation including:
   a stress function which expresses a radial stress of the film in a film roll, the film roll being constituted by the core and the film wound around the core; and
   a winding tension function which expresses the winding tension as a function of a coordinate in a radial direction of the core, the winding tension function being explicitly expressed in the winding equation,
   the optimized winding tension function being the winding tension function as obtained in a case where a design variable no longer changes when the design variable is updated to minimize a value of an expanded objective function,
   the design variable representing a plurality of values of the winding tension function at a plurality of positions at which a radius of the film roll is divided,
   the expanded objective function being obtained by adding:
   (1) an objective function which includes, as parameters, at least (a) a tangential stress in the film roll and (b) a frictional force between layers of the film; and
   (2) a penalty function in accordance with constraint condition functions which (c) constrain a minimum value of the tangential stress to be a non-negative value and (d) constrain the frictional force to be not less than a critical frictional force at which slippage of the film occurs.

2. The method as set forth in claim 1, wherein the expanded objective function has a value which is obtained by solving the winding equation in accordance with the design variable.

3. The method as set forth in claim 1, wherein:
   (a) a function expressing the tangential stress and (b) a function expressing the frictional force are each a function of the stress function;
   the stress function is obtained by establishing a value of the winding tension function in accordance with the design variable and subsequently solving the winding equation; and
   a value of the expanded objective function is obtained from (c) the tangential stress and (d) the frictional force.

4. The method as set forth in claim 1, wherein radial stress applied to the core has an absolute value which is not more than a critical stress.

5. The method as set forth in claim 1, wherein at a radial position corresponding to 95% of a radius at an outermost layer of the film roll, the frictional force between the layers of the film is not less than a value obtained by multiplying (a) a mass of the film roll and (b) an acceleration equivalent to ten times gravity.

6. A film roll comprising a core and a film wound around the core, wherein:
the film roll has a radial stress distribution and a tangential stress distribution which are obtained by use of non-linear programming which utilizes a winding equation, the winding equation including:
a stress function which expresses a radial stress of the film in the film roll; and
a winding tension function which expresses the winding tension as a function of a coordinate in a radial direction of the core, the winding tension function being explicitly expressed in the winding equation,
the radial stress distribution being expressed by the stress function as obtained by solving the winding equation in accordance with an optimized winding tension function,
the tangential stress distribution being obtained by solving the winding equation in accordance with the optimized winding tension function,
the optimized winding tension function being the winding tension function as obtained in a case where a design variable no longer changes when the design variable is updated to minimize a value of an expanded objective function,
the design variable representing a plurality of values of the winding tension function at a plurality of positions at which a radius of the film roll is divided,
the expanded objective function being obtained by adding:
(1) an objective function which includes, as parameters, at least (a) a tangential stress in the film roll and (b) a frictional force between layers of the film; and
(2) a penalty function in accordance with constraint condition functions which (c) constrain a minimum value of the tangential stress to be a non-negative value and (d) constrain the frictional force to be not less than a critical frictional force at which slippage of the film occurs.

7. A film winding device comprising at least:
a rotation driving device for rotating a core around which a film is wound; and
a winding tension adjustment device for adjusting a winding tension with which the film is wound around the core,
wherein the film winding device controls the winding tension adjustment device in accordance with an optimized winding tension function,
the optimized winding tension function being obtained by use of nonlinear programming which utilizes a winding equation, the winding equation including:
a stress function which expresses a radial stress of the film in a film roll, the film roll being constituted by the core and the film wound around the core; and
a winding tension function which expresses the winding tension as a function of a coordinate in a radial direction of the core, the winding tension function being explicitly expressed in the winding equation,
the optimized winding tension function being the winding tension function as obtained in a case where a design variable no longer changes when the design variable is updated to minimize a value of an expanded objective function,
the design variable representing a plurality of values of the winding tension function at a plurality of positions at which a radius of the film roll is divided,
the expanded objective function being obtained by adding:
(1) an objective function which includes, as parameters, at least (a) a tangential stress in the film roll and (b) a frictional force between layers of the film; and
(2) a penalty function in accordance with constraint condition functions which (c) constrain a minimum value of the tangential stress to be a non-negative value and (d) constrain the frictional force to be not less than a critical frictional force at which slippage of the film occurs.

8. A method for producing a film roll by winding a film around a core in accordance with an optimized winding tension function,
the optimized winding tension function being obtained by use of nonlinear programming which utilizes a winding equation, the winding equation including:
a stress function which expresses a radial stress of the film in the film roll, the film roll being constituted by the core and the film wound around the core; and
a winding tension function which expresses a winding tension of the film as a function of a coordinate in a radial direction of the core, the winding tension function being explicitly expressed in the winding equation,
the optimized winding tension function being the winding tension function as obtained in a case where a design variable no longer changes when the design variable is updated to minimize a value of an expanded objective function,
the design variable representing a plurality of values of the winding tension function at a plurality of positions at which a radius of the film roll is divided,
the expanded objective function being obtained by adding:
(1) an objective function which includes, as parameters, at least (a) a tangential stress in the film roll and (b) a frictional force between layers of the film; and
(2) a penalty function in accordance with constraint condition functions which (c) constrain a minimum value of the tangential stress to be a non-negative value and (d) constrain the frictional force to be not less than a critical frictional force at which slippage of the film occurs.

* * * * *